United States Patent
Ishii

(10) Patent No.: US 8,891,445 B2
(45) Date of Patent: Nov. 18, 2014

(54) BASE STATION APPARATUS AND COMMUNICATION CONTROL METHOD

(75) Inventor: Hiroyuki Ishii, Yokosuka (JP)

(73) Assignee: NTT Docomo, Inc., Tokyo (JP)

( * ) Notice: Subject to any disclaimer, the term of this patent is extended or adjusted under 35 U.S.C. 154(b) by 394 days.

(21) Appl. No.: 13/000,818

(22) PCT Filed: Jun. 10, 2009

(86) PCT No.: PCT/JP2009/060638
§ 371 (c)(1),
(2), (4) Date: Mar. 15, 2011

(87) PCT Pub. No.: WO2009/157311
PCT Pub. Date: Dec. 30, 2009

(65) Prior Publication Data
US 2011/0170483 A1  Jul. 14, 2011

(30) Foreign Application Priority Data
Jun. 24, 2008 (JP) ................................ 2008-165137

(51) Int. Cl.
H04W 72/00 (2009.01)
H04W 72/04 (2009.01)
H04W 76/04 (2009.01)

(52) U.S. Cl.
CPC ........ *H04W 72/0446* (2013.01); *H04W 76/048* (2013.01)
USPC ........................................................ 370/328

(58) Field of Classification Search
USPC ............................ 370/253–350; 709/201–213
IPC ............... H04J 11/0069,11/0086; H04W 24/10, H04W 36/0088, 72/1215, 88/06, 16/14, 36/0094, 36/14, 36/30, 48/16, 56/00, 72/1268, H04W 72/1289, 76/04
See application file for complete search history.

(56) References Cited

U.S. PATENT DOCUMENTS

| | | | | |
|---|---|---|---|---|
| 7,035,220 B1* | 4/2006 | Simcoe | | 370/236 |
| 8,089,942 B2* | 1/2012 | Cai et al. | | 370/338 |
| 8,300,533 B2* | 10/2012 | Malladi et al. | | 370/235 |
| 8,400,934 B2* | 3/2013 | DiGirolamo et al. | | 370/252 |
| 8,433,316 B2* | 4/2013 | Umatt et al. | | 455/434 |
| 8,548,471 B2* | 10/2013 | Iwamura et al. | | 455/436 |
| 2009/0325580 A1* | 12/2009 | Kazmi et al. | | 455/436 |
| 2010/0113055 A1* | 5/2010 | Iwamura et al. | | 455/452.1 |
| 2011/0205928 A1* | 8/2011 | Pelletier et al. | | 370/252 |

OTHER PUBLICATIONS

Panasonic, "Relation between DRX and Gap for Measurement," 3GPP TSG RAN WG2 #60, R2-074856, Nov. 2007, 3 pages.
3GPP TS 36.211 V8.1.0, Nov. 2007, "Evolved Universal Terrestrial Radio Access (E-UTRA); Physical Channels and Modulation," 54 pages.

(Continued)

*Primary Examiner* — Ayaz Sheikh
*Assistant Examiner* — Debebe Asefa
(74) *Attorney, Agent, or Firm* — Osha Liang LLP

(57) ABSTRACT

A base station apparatus includes a measurement gap assignment unit configured to assign a user equipment a measurement gap for measuring received quality for a frequency different from a frequency assigned to the user equipment and a DRX duration assignment unit configured to assign a DRX controlled user equipment a DRX duration. The measurement gap assignment unit sets the measurement gap to except the DRX duration and a duration for retransmitting a downlink signal.

10 Claims, 17 Drawing Sheets

(56) References Cited

OTHER PUBLICATIONS

3GPP TS 36.300 V8.3.0, Dec. 2007, Evolved Universal Terrestrial Radio Access (E-UTRA) and Evolved Universal Terrestrial Radio Access Network (E-UTRAN), 120 pages.
International Search Report issued in PCT/JP2009/060638, mailed on Sep. 8, 2009, with translation, 7 pages.
Written Opinion issued in PCT/JP2009/060638, mailed on Sep. 8, 2009, 3 pages.
Extended European Search Report in a counterpart European Application No. 09770021.5 issued on Jun. 25, 2014 (10 pages).
Panasonic; "Measurement Gap Control Functionality"; 3GPP TSG RAN WG2 #59, R2-073275; Athens, Greece; Aug. 20-24, 2007 (4 pages).
Nokia Siemens Networks, Nokia; "Measurement Gap Creation"; 3GPP TSG-RAN WG2 #59, R2-073397; Athens, Greece; Aug. 20-24, 2007 (5 pages).

* cited by examiner

FIG.12

| SEMI PERSISTENT SUBFRAME | #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|---|
| RB CONSUMPTION AMOUNT | 2 | 3 | 8 | 7 | 10 | 4 | 6 | 5 | 2 | 5 | 10 | 11 | 8 | 7 | 10 | 4 | 6 | 5 | 2 | 5 |

FIG.16

| SEMI PERSISTENT SUBFRAME | #0 | #1 | #2 | #3 | #4 | #5 | #6 | #7 | #8 | #9 | #10 | #11 | #12 | #13 | #14 | #15 | #16 | #17 | #18 | #19 |
|---|---|---|---|---|---|---|---|---|---|---|---|---|---|---|---|---|---|---|---|---|
| RB CONSUMPTION AMOUNT | 2 | 3 | 8 | 7 | 10 | 4 | 6 | 5 | 2 | 5 | 10 | 11 | 8 | 7 | 10 | 4 | 6 | 5 | 2 | 5 |

BASE STATION APPARATUS AND COMMUNICATION CONTROL METHOD

TECHNICAL FIELD

The present invention relates to a mobile communication system and particularly relates to a base station apparatus and a communication control method.

BACKGROUND ART

A successor communication scheme of W-CDMA (Wideband-Code Division Multiple Access) and HSPA (High Speed Packet Access), a so-called LTE (Long Term Evolution), has been discussed by W-CDMA standardization group 3GPP (3$^{rd}$ Generation Partnership Project).

In the LTE, it is being discussed that OFDMA (Orthogonal Frequency Division Multiplexing Access) and SC-FDMA (Single-Carrier Frequency Division Multiple Access) are to be applied as radio access schemes to downlinks and uplinks, respectively. See non-patent document 1, for example.

The OFDMA is a scheme where a certain frequency band is segmented into multiple smaller frequency bands (subcarriers) and data is transferred in the individual frequency bands. According to the OFDMA, the subcarriers are densely arranged in such a manner that they partially overlap on a frequency axis without mutual interference, which can realize fast transmission and improve frequency utilization efficiency.

The SC-FDMA is a transmission scheme where a certain frequency band is segmented into frequency bands and the different frequency bands are used among multiple user equipments for transmissions, resulting in reduced interference among the multiple user equipments. According to the SC-FDMA, it has a feature of smaller variations of transmission power, which can save power consumption of user equipments and realize wide coverage.

The LTE is a communication system where one or more physical channels are shared among multiple user equipments in any of uplinks and downlinks. The channels shared among the multiple user equipments are generally called shared channels, which correspond to a PUSCH (Physical Uplink Shared Channel) in the uplinks and a PDSCH (Physical Downlink Shared Channel) in the downlinks in the LTE. Also, the shared channels correspond to a UL-SCH (Uplink Shared Channel) in the uplinks and a DL-SCH (Downlink Shared Channel) in the downlinks as transport channels.

In a communication system using the above-mentioned shared channels, it is necessary to signal which of the user equipments are assigned the shared channels for each subframe (1 ms in the LTE). In the LTE, a control channel used for this signaling is referred to as a PDCCH (Physical Downlink Control Channel), a DL-L1/L2 control channel or DCI (Downlink Control Information). The PDCCH may include downlink scheduling information, an uplink scheduling grant, a transmission power control command bit and so on. See non-patent document 2, for example. Also, the subframe may be called a TTI (Transmission Time Interval).

The downlink scheduling information and the uplink scheduling grant correspond to signaling information for indicating which user equipments are assigned the shared channels. The downlink scheduling information may be called a downlink scheduling grant or downlink assignment information.

In the LTE, a synchronous HARQ is applied to uplinks as a HARQ scheme. In other words, as illustrated in FIG. 1, retransmission of uplink shared channels is conducted at a predefined timing from the first transmission timing and more specifically is conducted at a constant cycle. FIG. 1 illustrates a case where the retransmission of the uplink shared channels is conducted at a cycle of 8 subframes. However, the 8 subframe cycle is simply illustrative, and any other cycle may be applied for the retransmission.

In a mobile communication system, when a user equipment moves from a communicating cell to an adjacent cell, the user equipment conducts handover to switch a communicating base station apparatus. Before the handover, the user equipment measures quality of the adjacent cell being a handover candidate and reports the measurement results to the base station apparatus. The quality may be represented as a received level, a received SINR and so on of a reference signal, for example. The reporting to the base station apparatus is conducted through a measurement report. The base station apparatus determines based on the measurement report whether the user equipment is to conduct the handover, and a handover indication message is transmitted to the user equipment as a handover command.

Here, the handover target cell may be not only a cell having the same frequency in the same system but also a cell having a different frequency in the same system or a cell using a different RAT (Radio Access Technology). The cell using the different RAT generally uses a frequency different from the handover source cell, and inevitably the frequency of the handover target cell would be different from that of the handover source cell.

FIG. 2 schematically illustrates handover between cells using different frequencies. In FIG. 2, a LTE system including mobile communication systems using a first frequency $f_1$ and a second frequency $f_2$ and a WCDMA system using a third frequency $f_3$ different from the first and second frequencies is illustrated. The handover between systems using different frequencies or different RATs is described in non-patent document 2, for example.

Generally, a user equipment includes a single radio signal processing unit and thus cannot transmit and receive signals at different frequencies simultaneously. For this reason, if a cell (different frequency cell) using a frequency different from a camped cell (serving cell) is measured, synchronization with the different frequency is required. Accordingly, a gap duration for measurement (measurement gap) is indicated from the base station apparatus to the user equipment in the measurement of the different frequency cell, and the user equipment measures the different frequency cell in the gap duration. More specifically, for example, the length of the gap duration, an arrival cycle (repetition period) of the gap duration, the frequency of the different frequency cell and so on are indicated to the user equipment under RRC measurement control, and the user equipment conducts the different frequency measurement in the indicated gap duration. The different frequency measurement includes frequency change, capturing of a synchronization channel, quality measurement and so on. The gap may be referred to as a measurement gap, for example. A RRC message being the above RRC measurement control may be referred to as a measurement configuration (MeasConfig). The MeasConfig is a RRC message for indicating a measurement configuration.

FIG. 3 is an image diagram of the gap. In FIG. 3, the length and the gap cycle of the gap duration are set to 6 ms and 40 ms, respectively. The term "different frequency measurement" used herein includes not only searching for the different frequency cell and measuring the quality thereof but also searching for the different RAT cell and measuring the quality thereof.

As stated above, the user equipment conducts the different frequency measurements in the gap duration and accordingly cannot communicate to the base station apparatus serving the camped cell (serving cell) in the gap duration.

Also in the LTE, DRX (Discontinuous Reception) control is applied. The DRX control is applied to the case where the base station apparatus is communicating to the user equipment and there is no data to be communicated, and when the user equipment is in the DRX state, the user equipment periodically or discontinuously receives the PDCCH. In this case, the user equipment only has to receive the PDCCH not at all timings but discontinuously, which can reduce battery power consumption.

FIG. 4 is an image diagram of the DRX control. In FIG. 4, the length of the reception duration is set to 5 ms, and the DRX cycle is set to 1280 ms. The reception duration may be referred to as an ON duration or On-duration.

If semi persistent scheduling is applied, the DRX control may be applied to the case where there is data to be communicated. Since it is presumed that the data is periodically transmitted in the semi persistent scheduling, it is not necessary to receive the PDCCH over all time durations. The semi persistent scheduling is a scheduling scheme presently being discussed to implement VoIP and so on. For downlinks, the base station apparatus (eNB) assigns downlink radio resources (PDSCH) to the user equipment in a fixed manner at a predefined cycle. The downlink radio resource starts at a sub-frame (assignment starting time point), in which downlink scheduling information is transmitted to the user equipment via the PDCCH. Also, for uplinks, the base station apparatus (eNB) assigns uplink radio resources (PUSCH) to the user equipment in a fixed manner at a predefined cycle. The uplink radio resource starts at a sub-frame (assignment starting time point), which is after 4 ms from a subframe when DCI is transmitted to the user equipment via the PDCCH.

RELATED ART DOCUMENT

Non-Patent Document

Non-patent document 1: 3GPP TS36.211 (V8.1.0) "Physical Channel and Modulation", November 2007
Non-patent document 2: 3GPP TS36.300 (V8.3.0) "E-UTRA and E-UTRAN Overall description", December 2007

DISCLOSURE OF INVENTION

Problem to be Solved by the Invention

As stated above, a user equipment cannot communicate to a base station apparatus serving a camped cell (serving cell) in a gap duration for different frequency measurement. On the other hand, a reception duration for receiving the PDCCH is discontinuously set in the DRX control. The user equipment receives the PDCCH only in the reception duration.

In the case where the gap duration for the different frequency measurement is set and the DRX control is conducted, if the gap duration and the reception duration are not set appropriately, various problems may arise.

FIG. 5 illustrates collision between the reception duration in the DRX control and the measurement gap: If the reception duration partially or fully overlaps with the gap duration, the user equipment could fail to receive the PDCCH in the reception duration. Due to reception failure of the PDCCH, the user equipment may find it difficult to return from the DRX state to normal communication state. FIG. 5 illustrates an exemplary case of the DRX cycle and the gap cycle both having 40 ms.

FIG. 6 illustrates collision between retransmission of the PDSCH and the measurement gap. Even in the case where the reception duration does not overlap with the gap duration at all, if a time duration between the reception duration and the gap duration is short, retransmission of the PUSCH indicated by the PDCCH in the reception duration may collide with the gap duration. As one example, FIG. 6 illustrates the case where the DRX cycle and the gap cycle both have 40 ms and the time duration between the reception duration and the gap duration is equal to 5 ms. Since the synchronous HARQ is applied to uplinks in the LTE as stated above, the collision may not be avoidable. The collision may be problematic in the case where the semi persistent scheduling is applied.

Alternatively, in the case where multiple user equipments reside within a cell, if the gap duration and the reception duration are set for all the user equipments at the same timing, the measurement gap and the DRX control would be managed for many user equipments, which may increase processing load of the base station apparatus at that timing.

The present invention addresses the above-mentioned problems, and one object of the present invention is to provide a base station apparatus and a communication control method that can address the overlap between the DRX reception duration and the gap duration, the collision between uplink retransmission and the gap duration and the increase in the processing load of the base station apparatus at the certain timing.

Means for Solving the Problem

In order to realize the above objects, a base station apparatus includes a measurement gap assignment unit configured to assign a user equipment a measurement gap for measuring received quality for a frequency different from a frequency assigned to the user equipment and a DRX duration assignment unit configured to assign a DRX controlled user equipment a DRX duration. The measurement gap assignment unit sets the measurement gap except the DRX duration and a duration for retransmitting a downlink signal.

A communication control method includes a step assigning a user equipment a measurement gap for measuring received quality for a frequency different from a frequency assigned to the user equipment and a step assigning a DRX controlled user equipment a DRX duration. The assigning the user equipment the measurement gap comprises setting the measurement gap to except the DRX duration and a duration for retransmitting a downlink signal.

Advantage of the Invention

According to the aspects of the present invention, it is possible to provide a base station apparatus and a communication control method that can address the overlap between the DRX reception duration and the gap duration, the collision between uplink retransmission and the gap duration and the increase in the processing load of the base station apparatus at the certain timing.

BRIEF DESCRIPTION OF DRAWINGS

FIG. 12 is a schematic diagram illustrating a DRX ON duration setting operation at a base station apparatus according to one embodiment;

FIG. 16 is a schematic diagram illustrating a DRX ON duration setting operation at a base station apparatus according to a base station apparatus according to one embodiment.

DETAILED DESCRIPTION OF EMBODIMENTS

Embodiments of the present invention are described below with reference to the drawings. In the following descriptions, the same or similar reference symbols are attached to the same or similar arrangements, and descriptions thereof are omitted.

First Embodiment

[Radio Communication System]

Figure 1:
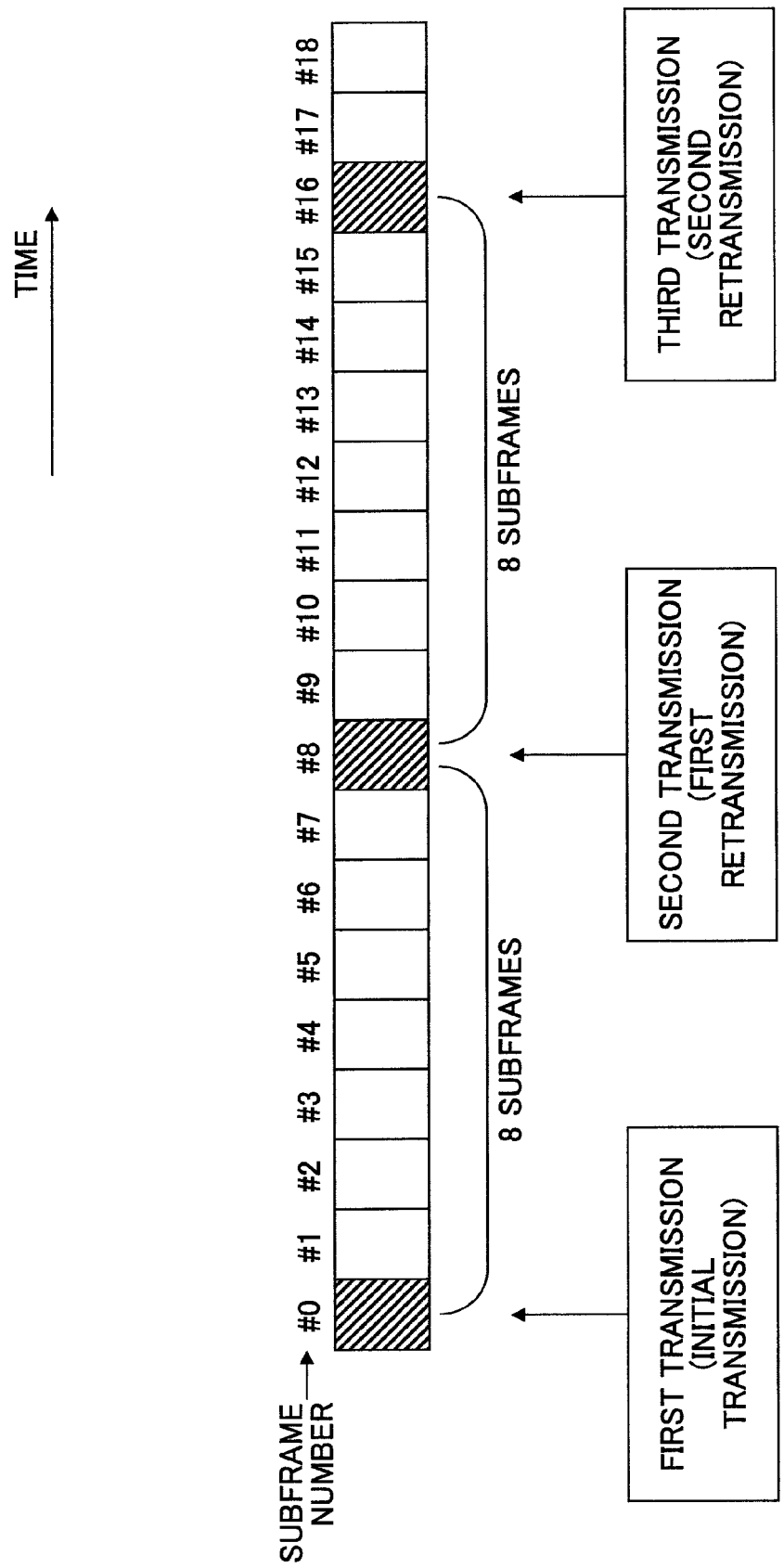
FIG. 1 is a schematic diagram illustrating retransmission control.
Figure 2:
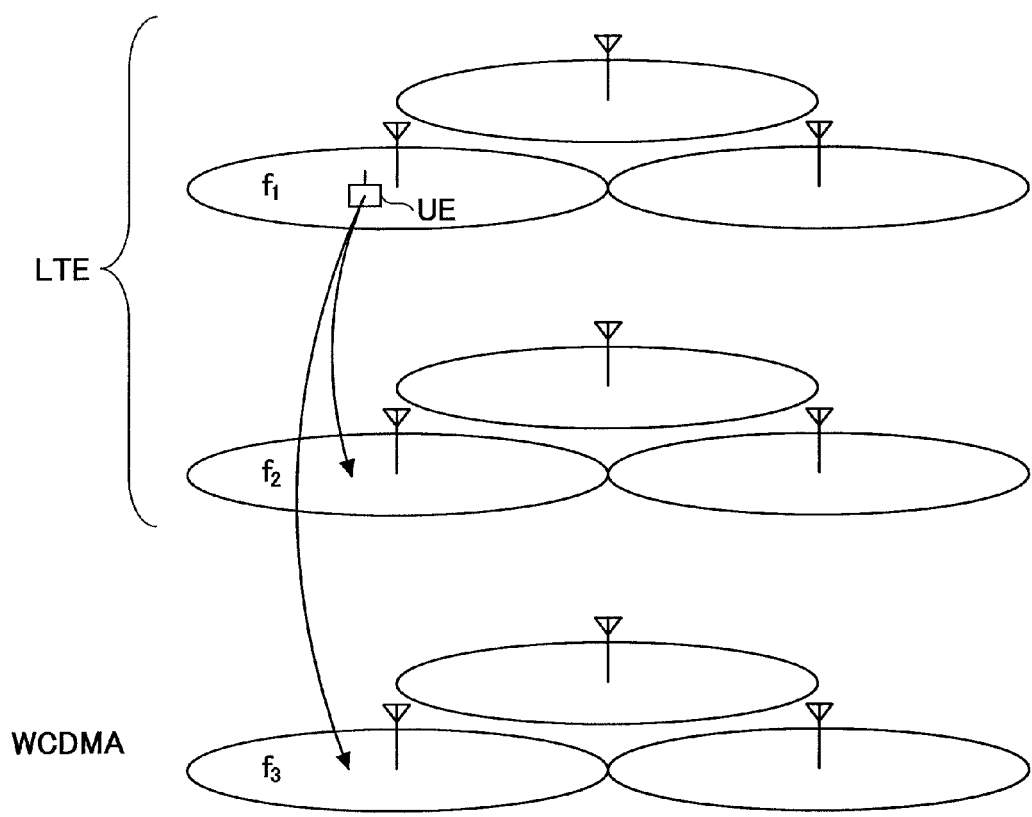
FIG. 2 is a schematic diagram illustrating different frequency/different RAT handover.
Figure 3:
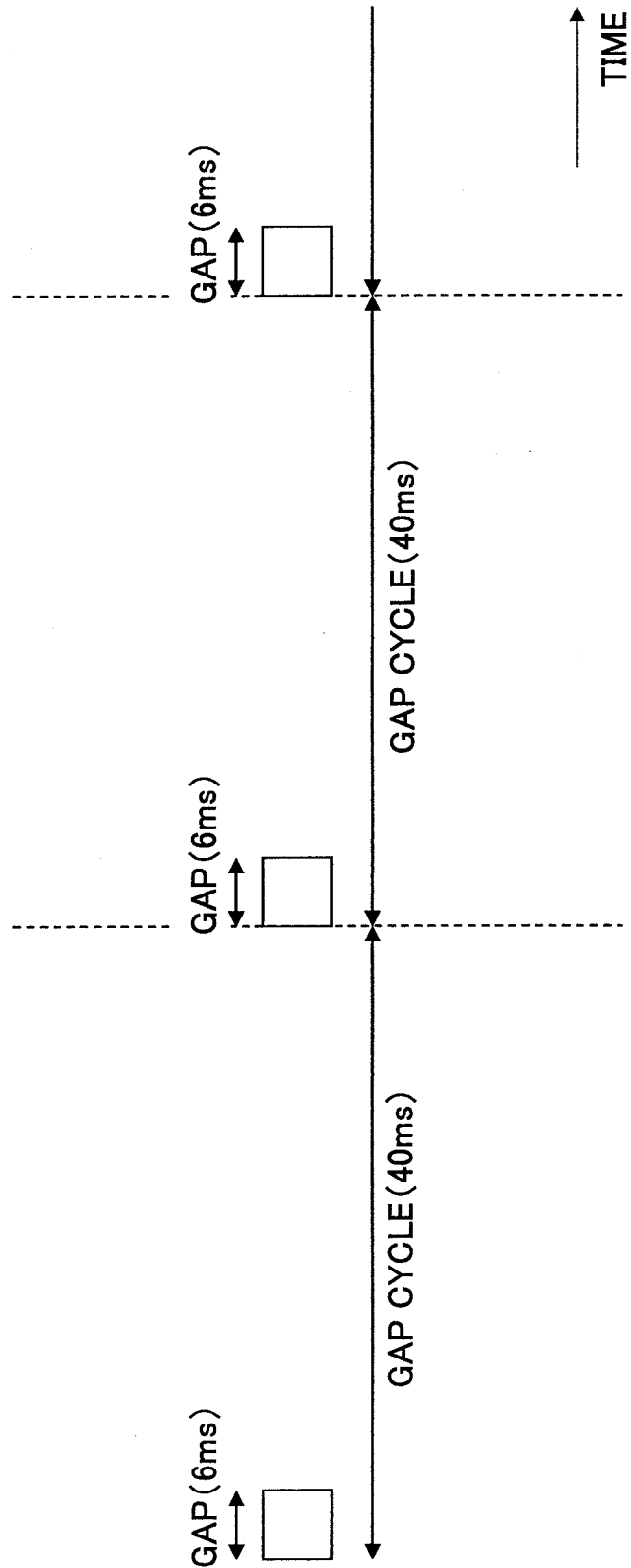
FIG. 3 is a schematic diagram illustrating a measurement gap.
Figure 4:
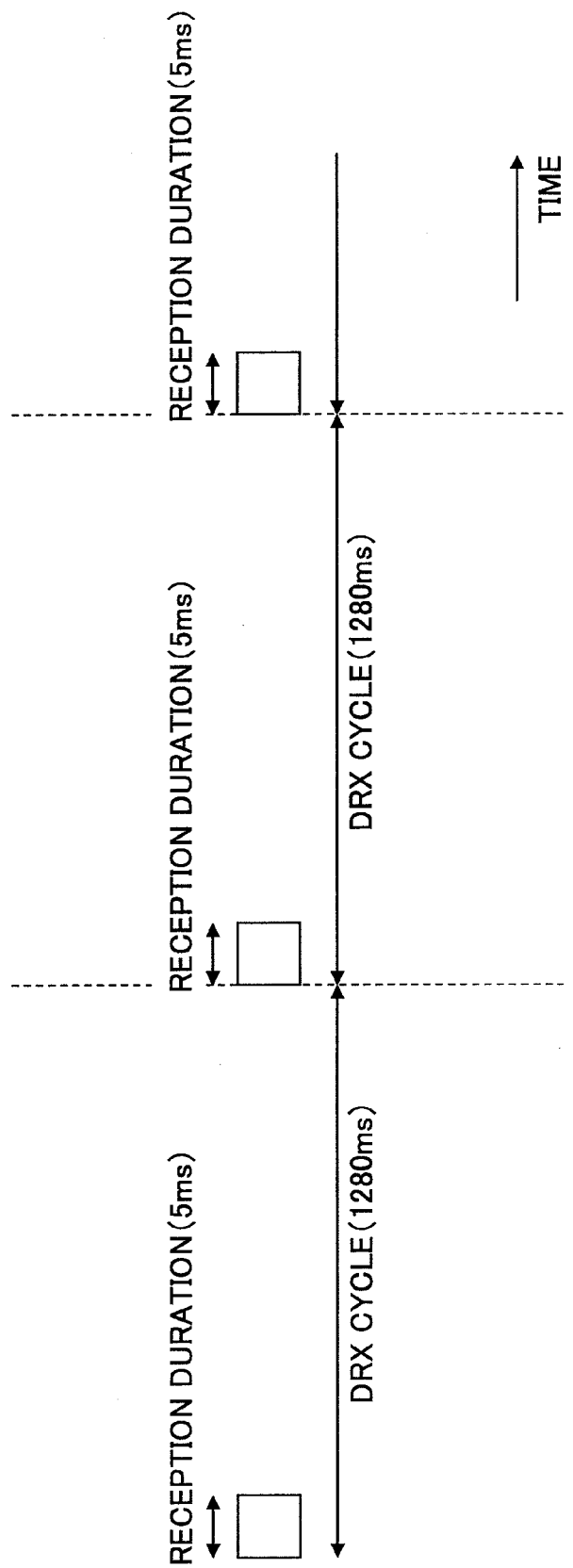
FIG. 4 is a schematic diagram illustrating DRX control.
Figure 5:
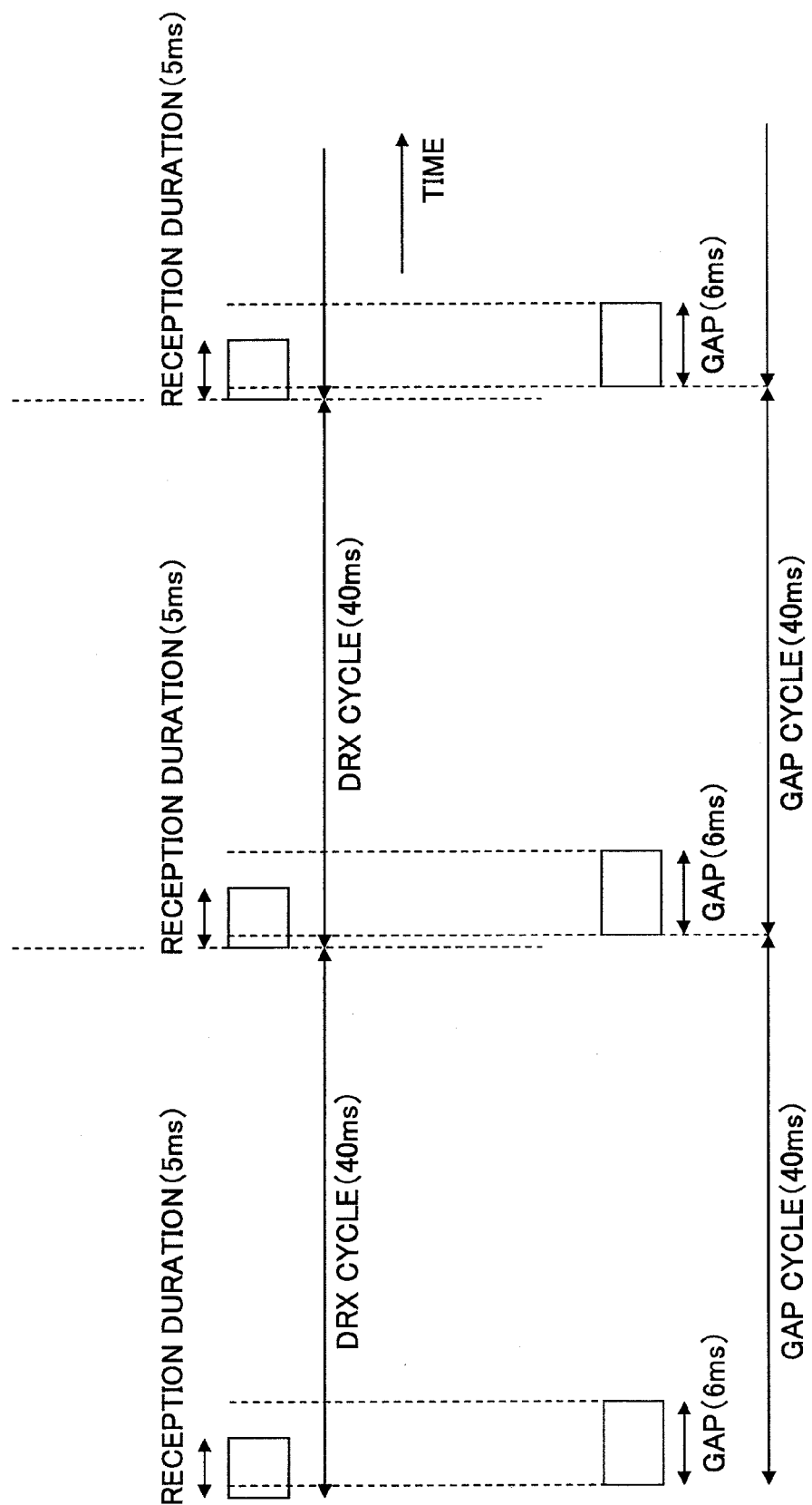
FIG. 5 is a schematic diagram illustrating collision between a reception duration in DRX control and a measurement gap.
Figure 6:
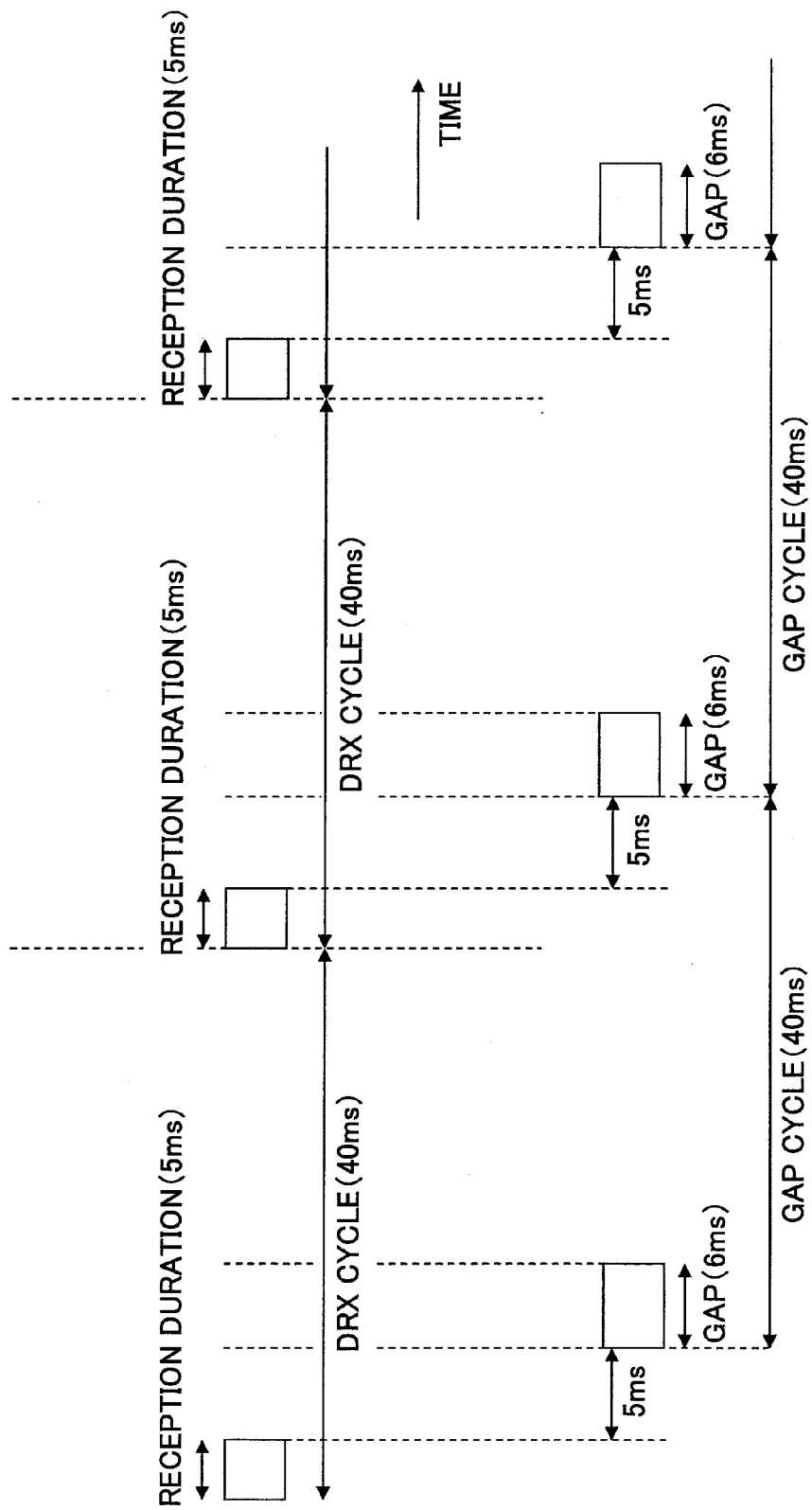
FIG. 6 is a schematic diagram illustrating collision between retransmission of an uplink shared channel and a measurement gap.
Figure 7:
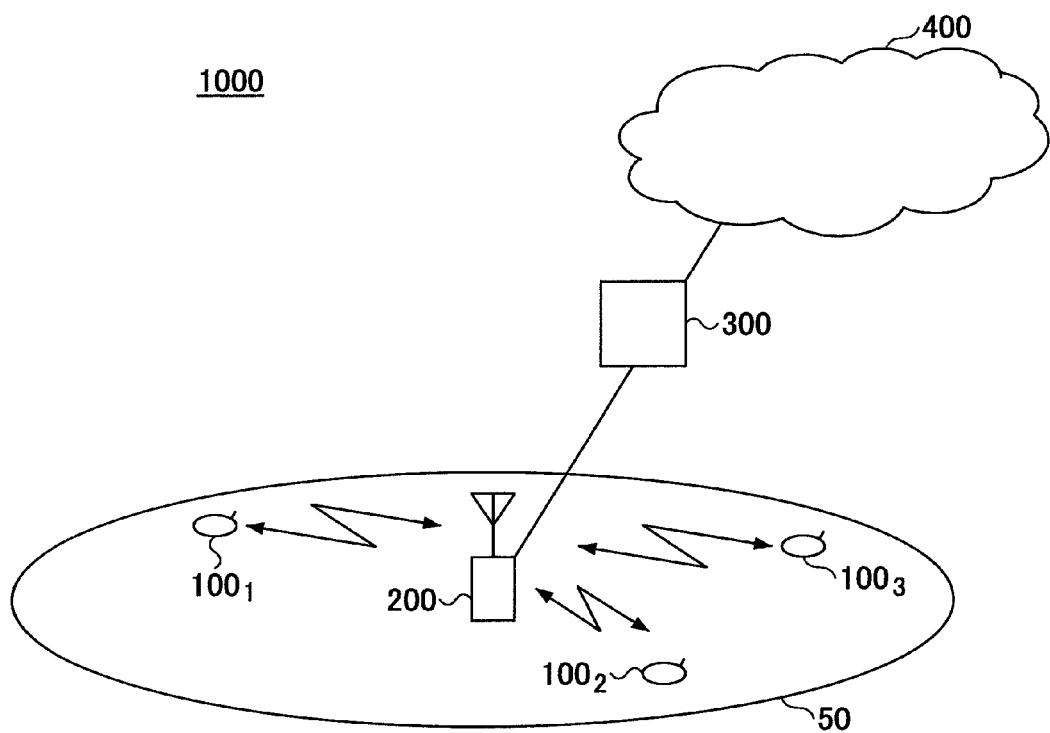
FIG. 7 is a schematic diagram illustrating a communication system according to one embodiment.

FIG. 7 illustrates a radio communication system according to this embodiment.

A radio communication system 1000 is an Evolved UTRA and UTRAN (also referred to as Long Term Evolution or Super 3G) applied system, for example. The radio communication system 1000 includes a base station apparatus (eNB: eNode B) 200 and multiple user equipments (also referred to as UEs or mobile stations) $100_n$ ($100_1$, $100_2$, $100_3$, ..., $100_n$ where n is a positive integer). The base station apparatus 200 is connected to an upper station such as an access gateway apparatus 300, and the access gateway apparatus 300 is connected to a core network 400. The user equipment $100_n$ communicates to the base station apparatus 200 in a cell 50 in Evolved UTRA and UTRAN. The access gateway may be referred to as a MME/SGW (Mobility Management Entity/Serving Gateway).

The user equipment $100_n$ ($100_1$, $100_2$, $100_3$, ..., $100_n$) has the same arrangement, function and state and is accordingly described below as the user equipment 100, unless specifically stated otherwise.

The OFDMA and the SC-FDMA are applied as radio access schemes to downlinks and uplinks, respectively, in the radio communication system 1000. As stated above, the OFDMA is a multi-carrier transmission scheme where a frequency band is segmented into multiple smaller frequency bands (subcarriers) and data is transferred in the individual frequency bands. The SC-FDMA is a single-carrier transmission scheme where a frequency band is segmented and the segmented different frequency bands are used among multiple terminals, resulting in reduction in interference among the terminals.

Here, communication channels in the Evolved UTRA and UTRAN are described.

In downlinks, a PDSCH (Physical Downlink Shared Channel) shared among the user equipments 100 and a PDCCH (Physical Downlink Control Channel) are used. The PDCCH is also referred to as a downlink L1/L2 control channel. Also, information mapped to the PDCCH may be referred to as DCI (Downlink Control Information). User data, that is, a normal data signal, is transmitted in the PDSCH. A transport channel mapped to the PDSCH is a DL-SCH (Downlink Shared Channel).

Also, downlink/uplink scheduling grants, transmission power control command bits and so on are transmitted in the PDCCH. The downlink (DL) scheduling grant may include a user ID of a user communicating in the PDSCH and transport format information of the user data, for example. The transport format information includes information on a data size, a modulation scheme and HARQ, assignment information on downlink resource blocks and so on. The uplink (UL) scheduling grant includes a user ID of a user communicating in the PUSCH and transport format information of the user data, for example. The transport format information includes information on a data size and a modulation scheme, assignment information of uplink resource blocks, transmit power information for the uplink shared channel and so on. Here, the uplink resource block corresponds to a frequency resource and may be referred to as a resource unit.

PDCCH mapped OFDM symbols include a PCFICH (Physical Control Format Indicator Channel) and a PHICH (Physical HARQ Indicator Channel). In other words, the PDCCH, the PCFICH and the PHICH are multiplexed to OFDM symbols, the number of which is less than or equal to a predefined number, and are transmitted. The PCFICH is a channel for indicating the number of PDCCH mapped OFDM symbols to UEs. The PHICH is a channel for transmitting acknowledgement for the PUSCH. Also, the PCFICH and the PHICH may be defined as channels having relationships parallel to the PDCCH. Alternatively, the PCFICH and the PHICH may be defined as information elements included in the PDCCH.

In uplinks, a PUSCH (Physical Uplink Shared Channel) shared among the user equipments $100_n$ and a PUCCH (Physical Uplink Control Channel) are used. User data, that is, a normal data signal, is transmitted in the PUSCH. A transport channel mapped to the PUSCH is an UL-SCH (Uplink Shared Channel). Also, downlink quality information (CQI: Channel Quality Indicator) for use in scheduling and AMC (Adaptive Modulation and Coding) for the PDSCH and acknowledgement information for the PDSCH are transmitted in the PUCCH. The acknowledgement information is represented as a positive response (ACK: Acknowledgement) indicative of successful reception of a transmission signal or a negative response (NACK: Negative Acknowledgement) indicative of unsuccessful reception.

The downlink quality information may be referred to as a CSI (Channel State Indicator) being a collective representation of the CQI, a PMI (Pre-coding Matrix Indicator) and a RI (Rank Indicator).

In addition to the CQI and the acknowledgement information, a scheduling request for resource assignment for the uplink shared channel may be transmitted in the PUCCH. Here, the resource assignment of the uplink shared channel means that the base station apparatus 200 uses the PDCCH in a certain subframe to indicate to the user equipment 100 that the user equipment 100 may communicate in the uplink shared channel in subsequent subframes.

If the PUSCH is transmitted, the CQI, the acknowledgement information and the scheduling request may be multiplexed and transmitted in the PUSCH.

A DL RS (Downlink Reference Signal) is transmitted in a downlink as a pilot signal commonly used among UEs. The DL RS is used for channel estimation for decoding the PDSCH, the PDCCH, the PCFICH and the PHICH and for calculation of the CQI, which is downlink radio quality information.

[Base Station]

Figure 8:
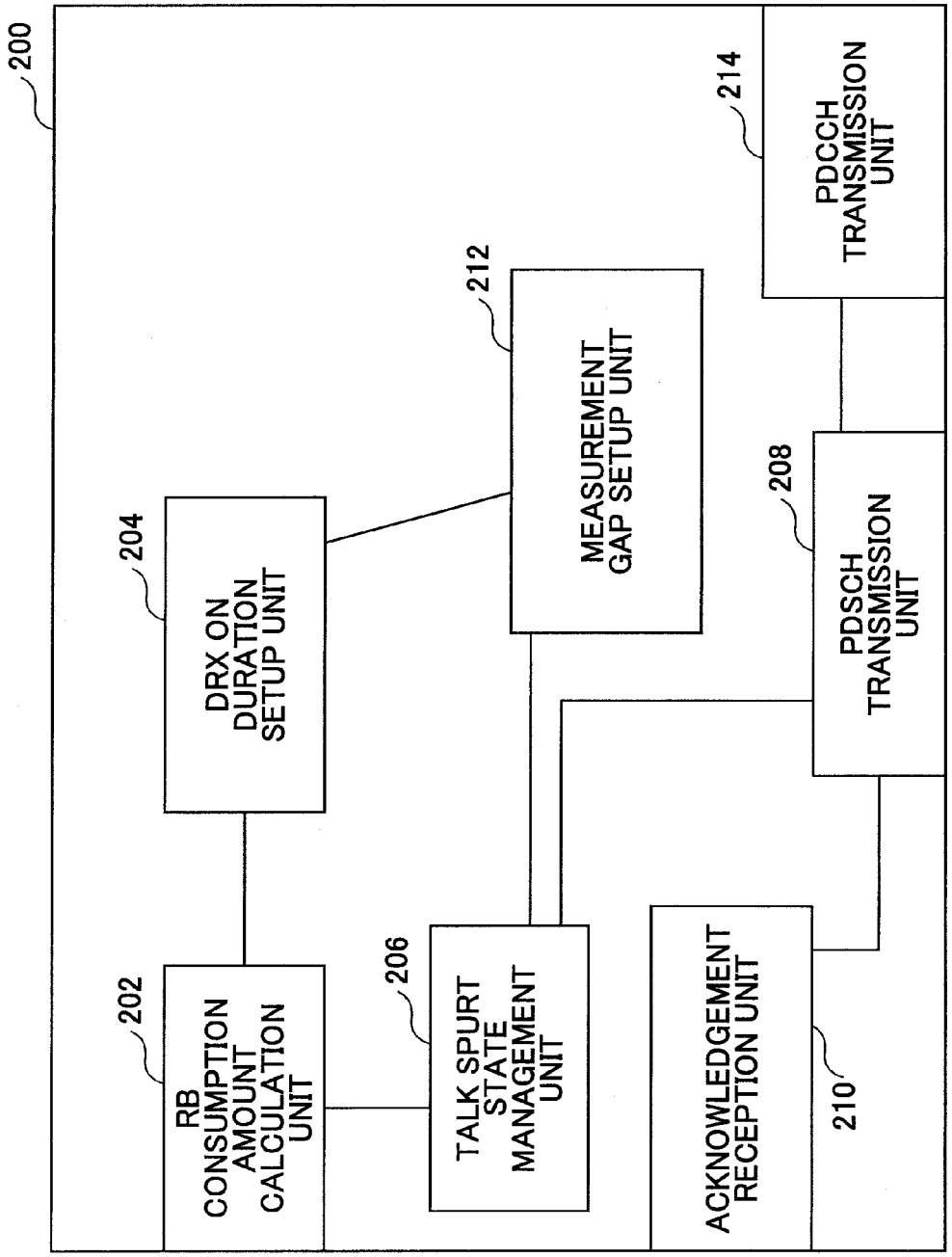
FIG. 8 is a partial block diagram illustrating a base station apparatus according to one embodiment.

FIG. 8 illustrates the base station apparatus 200 according to this embodiment.

In this embodiment, a downlink and an uplink are separately described for convenience.

[Downlink]

The downlink is described.

The base station apparatus 200 according to this embodiment persistently assigns downlink radio resources to the user equipments 100 at a predefined cycle having a starting point corresponding to the assignment starting time point. Also, the base station apparatus 200 uses the downlink radio resources to transmit downlink data. The downlink radio resources may include radio resources for transmitting the PDSCH.

The base station apparatus 200 according to this embodiment includes a RB consumption amount calculation unit 202, a DRX ON duration setup unit 204, a Talk Spurt state management unit 206, a PDSCH transmission unit 208, an acknowledgement information reception unit 210, a measurement gap setup unit 212 and a PDCCH transmission unit 214.

The RB consumption amount calculation unit 202 calculates an amount of resources consumed for subframes within a transmission duration in semi persistent scheduling. The transmission duration may be predefined. The subframe may be referred to as a time frame. Here, the resource includes a frequency resource. The resource consumption amount includes an amount or quantity of resource blocks. For example, one resource block corresponds to 180 kHz in the LTE scheme. Also, one subframe corresponds to 1 ms. For example, if the predefined transmission duration in semi persistent scheduling is set to 20 ms, the RB consumption amount calculation unit 202 calculates an amount of resources consumed for each of 20 subframes.

The DRX ON duration setup unit 204 is connected to the RB consumption amount calculation unit 202 and sets a reception duration to each user equipment 100 subjected to DRX control in a cell. The reception duration corresponds to an ON duration of the DRX state. For example, the DRX ON duration setup unit 204 sets the DRX ON duration based on the resource consumption amount calculated by the RB consumption amount calculation unit 202.

Alternatively, the DRX ON duration setup unit 204 may set the DRX ON duration based on the number of user equipments falling into the DRX ON duration for each subframe instead of the resource consumption amount. More specifically, the DRX ON duration setup unit 204 may set the DRX ON duration to minimize the number of user equipments falling into the DRX ON duration. Alternatively, the DRX ON duration setup unit 204 may set the DRX ON duration based on the user equipments at the starting point of the DRX ON duration for each subframe. More specifically, the DRX ON duration setup unit 204 may set the DRX ON duration such that a subframe of the minimum number of user equipments, for which the sub-frame is at the starting point of the DRX ON duration, is put at the starting point of the DRX ON duration.

The Talk Spurt state management unit 206, which is connected to the RB consumption amount calculation unit 202, manages Talk Spurt state of individual user equipments in a cell, that is, makes management as to whether to conduct resource assignment in accordance with the semi persistent scheduling. In the resource assignment in accordance with the semi persistent scheduling, an assignment starting time point is set as a starting point, and downlink data is transmitted in downlink radio resources persistently assigned at a predefined cycle. The downlink radio resources include the PDSCH.

The PDSCH transmission unit 208, which is connected to the Talk Spurt state management unit 206, transmits downlink data to the user equipment 100 with the Talk Spurt state being ON by using downlink radio resources persistently assigned at a predefined cycle having the assignment starting time point as its starting point. The downlink radio resources include the PDSCH.

The acknowledgement information reception unit 210, which is connected to the PDSCH transmission unit 208, receives acknowledgement information to downlink radio resources. The downlink radio resources include the PDSCH.

The measurement gap setup unit 212, which is connected to the DRX ON duration setup unit 204 and the Talk Spurt state management unit 206, sets a gap duration (measurement gap) for measuring a cell (different frequency cell) having a frequency different from a camped cell (serving cell). In this measurement gap, the user equipment 100 conducts different frequency measurement. Also, the user equipment 100 may perform different RAT measurement in the measurement gap. A cycle of the measurement gap may be equal to a multiple number of 20 ms, for example. The cycle of the measurement gap may be set to 40 ms, 80 ms and 120 ms, for example.

Figure 9:
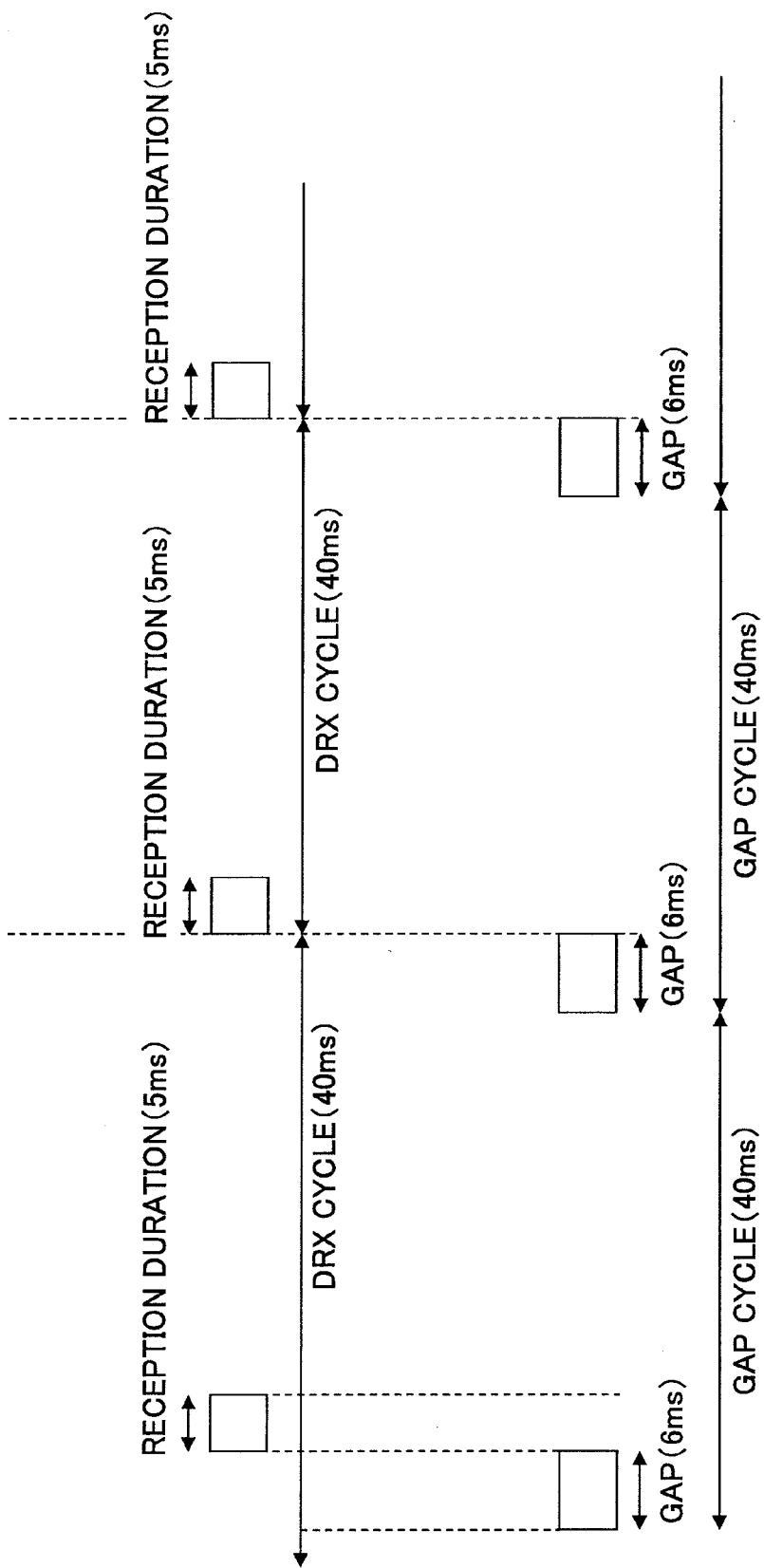
FIG. 9 is a schematic diagram illustrating an operation of a base station apparatus according to one embodiment.

The measurement gap setup unit 212 assigns a gap duration (measurement gap) to a user equipment subjected to DRX control such that the reception duration in the DRX control does not collide with the measurement gap. Particularly, since the semi persistent scheduling applied user equipment has a limited time duration of receiving downlink signals, the measurement gap setup unit 212 assigns the gap duration (measurement gap) such that the reception duration of the DRX control does not collide with the measurement gap. Here, the downlink signal may be the PDCCH, for example. Also, the measurement gap setup unit 212 assigns the gap duration (measurement gap) such that retransmission of the uplink shared channel specified in the PDCCH in the reception duration in the DRX control does not collide with the measurement gap. Also, the measurement gap setup unit 212 may assign the gap duration (measurement gap) such that retransmission of the downlink shared channel does not collide with the measurement gap. Specifically, as illustrated in FIG. 9, the measurement gap setup unit 212 sets the gap duration (measurement gap) immediately before the reception duration in the DRX control. In other words, the measurement gap setup unit 212 sets the measurement gap to include a subframe immediately before the reception duration in the DRX control. The set measurement gap is indicated to the user equipment 100, for example, through RRC measurement control. A RRC message called the RRC measurement control may be referred to as a MeasConfig. The MeasConfig is a RRC message for specifying measurement arrangement.

An exemplary case where the DRX control starts at a time point of shifting m subframes from a certain reference time point is described. In this case, starting time point A of the reception duration in the n-th DRX control is represented by formula (1). In formula (1), α represents a DRX cycle.

$$A = \alpha \times n + m \qquad (1)$$

For example, in the case of the DRX cycle α=20, A=20×n+m.

Also, starting time point B of the measurement gap is represented by formula (2). In formula (2), β represents a cycle of the measurement gap.

$$B = \beta \times n + k \qquad (2)$$

For example, in the case of the cycle of the measurement gap β=40, B=40×n+k.

For example, if the measurement gap is set to 6 ms, k=m−6. Also, k may be equal to m−26 (k=m−26).

In the case where a gap duration (measurement gap) is set immediately before the reception duration in the DRX control and there are multiple timings of setting the gap duration (for example, k=m−6 and k=m−26 in the above example), the measurement gap setup unit 212 may set the gap duration based on the number of user equipments in the gap duration in each subframe. More specifically, if there are multiple timings of setting the gap duration, the gap duration may be set at a timing corresponding to the minimum number of user equipments in the gap duration. In this case, if the above operation is conducted on the user equipments 100 in the cell sequentially, the gap duration would be accordingly set such that the number of user equipments in the gap duration in the different subframes is equal. The equal number of user equipments in the gap duration in the different subframes means that processing load in the base station is equalized in the time direction, and as a result, it is possible to avoid increase in the processing load in the base station at only a certain timing.

Alternatively, in the case where the gap duration (measurement gap) is set immediately before the reception duration in the DRX control and there are multiple timings of setting the gap duration (for example, k=m−6 and k=m−26 in the above example), the measurement gap setup unit 212 may randomly select the timing among the timings. For example, in the above case where the two timings, k=m−6 and k=m−26, are provided, the measurement gap setup unit 212 may select k=m−6 with probability of 0.5 and k=m−26 with probability of 0.5. In this case, the measurement gap setup unit 212 would set the gap duration such that the number of user equipments in the gap duration in each subframe is equalized. The equal number of user equipments in the gap duration in the different subframes means that the processing load in the base station is equalized in the time direction and accordingly it is possible to avoid increase in the processing load in the base station at only a certain timing.

Although the measurement gap setup unit 212 sets the gap duration (measurement gap) immediately before the reception duration in the DRX control in the above-mentioned example, the measurement gap setup unit 212 may instead set the gap duration (measurement gap) shortly before the reception duration in the DRX control. More specifically, the measurement gap setup unit 212 may provide a guard duration of 1 ms before the reception duration in the DRX control and set the gap duration (measurement gap) immediately before the guard duration. In the case, it holds that k=m−7 or k=m−27 in the above-mentioned formulae (1) and (2). Here, the guard duration may be set to be 1 ms, 2 ms or any other value in length.

The PDCCH transmission unit 214 is connected to the PDSCH transmission unit 208 and if it is determined to indicate initial transmission resources for the semi persistent scheduling, transmits downlink scheduling information to the user equipment. The downlink scheduling information includes a persistent assignment signal. The downlink scheduling information is mapped to the PDCCH.

Here, the persistent assignment signal, that is, the PDCCH for indicating the initial transmission resources for the semi persistent scheduling may be referred to as a CRC masked PDCCH to which a CRC is masked by a semi persistent scheduling-radio network temporary ID (SPS-RNTI).

Figure 10:
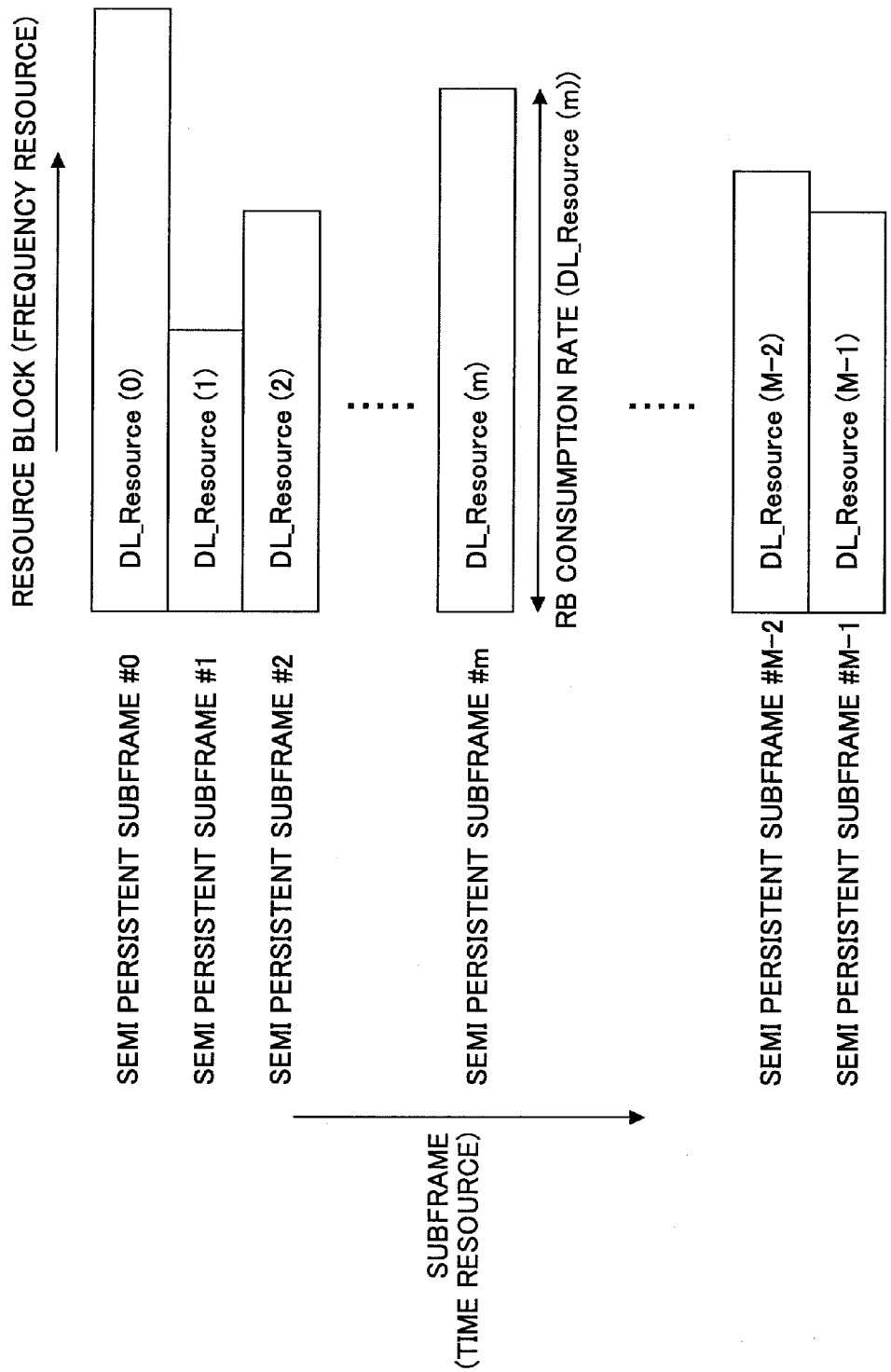
FIG. 10 is a schematic diagram illustrating calculation of a consumption amount of resource blocks at a base station apparatus according to one embodiment.

FIG. 10 illustrates exemplary calculation of an amount of consumed resource blocks in the RB consumption amount calculation unit 202.

Subframes in a predefined cycle are defined as semi persistent subframes. The RB consumption amount calculation unit 202 calculates an amount of consumed resources for each of the semi persistent subframes. In FIG. 10, the resource consumption amount is represented by DL_Resource(m) (m is an integer greater than or equal to 0). In FIG. 10, m represents an index of the semi persistent subframes. In FIG. 10, M represents the total number of the semi persistent subframes. In other words, M represents the total number of subframes in a predefined cycle.

The resource consumption amount DL_Resource(m) for each semi persistent subframe corresponds to the number of resource blocks (RBs) assigned to a SCH (Synchronization Channel)/P-BCH (Physical-Broadcast Channel), a D-BCH (Dynamic-Broadcast Channel), a PCH (Paging Channel), a RACH (RandomAccess Channel) response, a MBMS (Multimedia Broadcast Multicast Service) and a semi persistent scheduling applied DL-SCH in semi persistent subframe #m.

Figure 11:
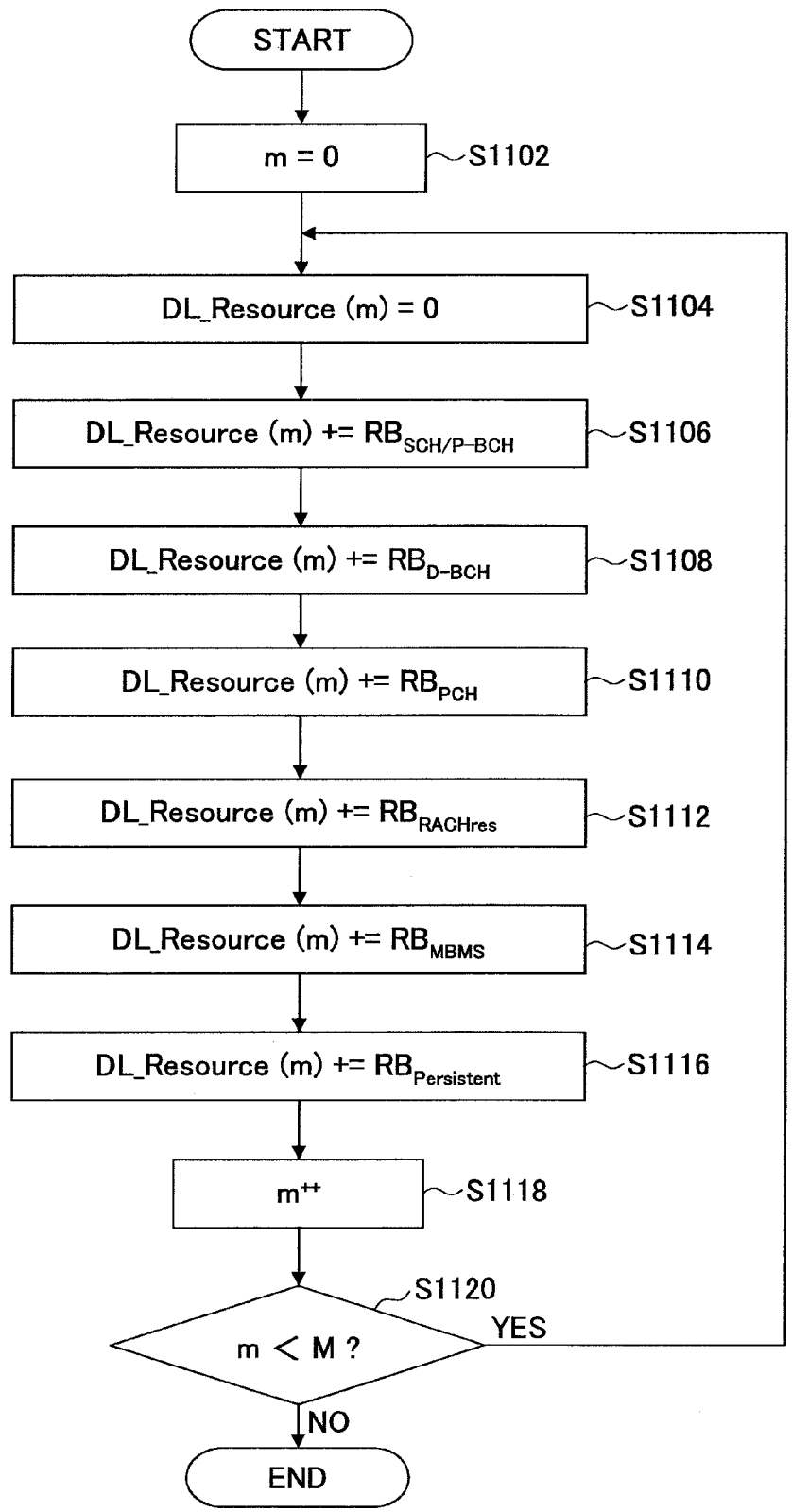
FIG. 11 is a flow diagram illustrating calculation of a consumption amount of resource blocks at a base station apparatus according to one embodiment.

FIG. 11 is a flow of an operation in the RB consumption amount calculation unit 202.

At step S1102, the index for the semi persistent subframe is set to 0.

At step S1104, the DL_Resource(m) value in the semi persistent subframe #m is initialized.

At step S1106, resource blocks $RB_{SCH/P-BCH}$ consumed for the SCH and the P-BCH are added to the DL_Resource(m). The resource blocks $RB_{SCH/P-BCH}$ consumed for the SCH and the P-BCH are calculated based on whether the SCH and the P-BCH are transmitted in semi persistent subframe #m. For example, if the SCH or the P-BCH is transmitted in semi persistent subframe #m, $RB_{SCH/P-BCH}$ is set to 6. If the SCH or the P-BCH is not transmitted in semi persistent subframe #m, $RB_{SCH/P-BCH}$ is set to 0. Also, for example, if the SCH or the P-BCH is transmitted in semi persistent subframe #m, $RB_{SCH/P-BCH}$ may be set to 7.

At step S1108, resource blocks $RB_{D-BCH}$ consumed for the D-BCH are added to the DL_Resource(m). The resource blocks $RB_{D-BCH}$ consumed for the D-BCH is calculated based on whether the D-BCH is transmitted in semi persistent subframe #m. For example, if the D-BCH is transmitted in semi persistent subframe #m, $RB_{D-BCH}$ is set to $RB_{D-BCH} = RB_{S1} \times Weight_{S1} + RB_{S2} \times Weight_{S2} + \square \ \square \ \square$. If the D-BCH is not transmitted in semi persistent subframe #m, $RB_{D-BCH}$ is set to 0. Here, S1, S2, $\square\square\square$ are indices indicative of types of the D-BCH. Also, S1, S2, $\square \ \square \ \square$ may be referred to as SI-1, SI-2, $\square \ \square \ \square$. Here, SI is an abbreviation of System Information. $RB_{S1}$ and $RB_{S2}$ represent the numbers of resource blocks assigned to D-BCH S1 and D-BCH S2, respectively. Also, $Weight_{S1}$ and $Weight_{S2}$ are weight factors. At step S1108, the number of resource blocks is counted for all D-BCHs possibly transmitted in semi persistent subframe #m. Also, the D-BCH may have a transmission cycle longer than the above-mentioned predefined cycle. In this case, there may be cases where the D-BCH is transmitted or is not transmitted in semi persistent subframe #m. By using the weight factors, influence on the resource consumption amount by the D-BCH transmission cycle can be adjusted. For example, in the case where the predefined cycle is set to 20 ms and the D-BCH transmission cycle is set to 80 ms, the weight factor may be set to Weight=20/80=0.25. Alternatively, for example, if the predefined cycle is set to 20 ms and the D-BCH transmission cycle is set to 80 ms, the weight factor may be set to Weight=1.0. Note that the D-BCH may be more specifically SIB1 or a SI message. In other words, the D-BCH may be used as a generic term of the SIB1 or the SI message. Also, the SI may consist of one or more SIBs (System Information Blocks) other than the SIB1.

At step S1110, resource blocks $RB_{PCH}$ consumed for the PCH are added to the DL_Resource (m). The resource blocks $RB_{PCH}$ consumed for the PCH are calculated based on a time average value ($RB_{PCH,average}$) of the number of resource blocks for the PCH previously transmitted in semi persistent subframe #m. For example, the $RB_{PCH}$ may be calculated as $RB_{PCH}=RB_{PCH,average} \times weight_{PCH}$. Here, $weight_{PCH}$ is a factor for adjusting how many resources are reserved for the PCH. For example, if extra resources must be reserved for the PCH due to significant variations of the PCH resources, $weight_{PCH}$ may be set to $weight_{PCH}=2$. On the other hand, if extra resources do not have to be reserved for the PCH due to slight variations of the PCH resources, $weight_{PCH}$ may be set to $weight_{PCH}=1$. At step S1110, the average number of resource blocks assigned to the PCH in semi persistent subframe #m is counted as the resource consumption amount DL_Resource(m).

At step S1112, resource blocks $RB_{RACHres}$ consumed for the RACH response are added to the DL_Resource(m). The resource blocks $RB_{RACHres}$ consumed for the RACH response are calculated based on a time average value ($RB_{RACHres,average}$) of the number of resource blocks for the RACH response previously transmitted in semi persistent subframe #m. For example, $RB_{RACHres}$ may be calculated as $RB_{RACHres}=RB_{RACHres,average} \times weight_{RACHres}$. Here, $weight_{RACHres}$ is a factor for adjusting how many resources are reserved for the RACH response. For example, if extra resources must be reserved for the RACH response due to significant variations of the RACH response resources, $weight_{RACHres}$ may be set to 2. On the other hand, for example, if extra resources do not have to be reserved for the RACH response due to slight variations of the RACH response, $weight_{RACHres}$ may be set to 1. At step S112, the average number of resource blocks assigned to the RACH response in semi persistent subframe #m is counted as the resource consumption amount DL_Resource(m).

At step S1114, resource blocks $RB_{MBMS}$ consumed for the MBMS are added to the DL_Resource(m). The resource blocks $RB_{MBMS}$ consumed for the MBMS are calculated based on whether the MBMS is transmitted in semi persistent subframe #m. For example, if the MBMS is transmitted in semi persistent subframe #m, $RB_{MBMS,tmp}$ is set as $RB_{MBMS,tmp}=RB_{MBMS} \times Weight_{MBMS}$. On the other hand, if the MBMS is not transmitted in semi persistent subframe #m, $RB_{MBMS,tmp}$ is set to 0. Here, $Weight_{MBMS}$ is a weight factor for correcting influence by the MBMS transmission cycle. At step S1114, if the MBMS is transmitted, the number of resource blocks assigned to the MBMS in semi persistent subframe #m is counted as the resource consumption amount DL_Resource(m).

At step S1116, resource blocks $RB_{persistent,DL}$ assigned to a downlink in accordance with the semi persistent scheduling are added to the DL_Resource(m). The resource blocks $RB_{Persistent,DL}$ assigned to the downlink in accordance with the semi persistent scheduling are calculated based on a time average value ($RB_{Persistent,average,DL}$) of the number of resource blocks for downlink data assigned in accordance with the semi persistent scheduling previously transmitted in semi persistent subframe #m. For example, the $RB_{Persistent,DL}$ may be calculated as $RB_{Persistent,DL}=RB_{Persistent,average,DL} \times weight_{Persistent,DL}$. In fact, if downlink data subjected to resource assignment in dynamic scheduling includes downlink data to be subjected to resource assignment in accordance with the semi persistent scheduling, the above calculation may be made by considering the number of resource blocks as the number of resource blocks for downlink data subjected to resource assignment in accordance with the semi persistent scheduling. Here, the downlink data includes both new transmission and retransmission. The $RB_{Persistent,average,DL}$ may be calculated as the downlink data including not both the new transmission and the retransmission but only the new transmission.

If the downlink data subjected to multiple resource assignments in accordance with the semi persistent scheduling is transmitted in semi persistent subframe #m, the total number of RBs for the downlink data subjected to the resource assignments in the semi persistent scheduling is used as the number of resource blocks for the downlink data subjected to the resource assignments in accordance with the semi persistent scheduling.

The weight factor $weight_{Persistent,DL}$ is a factor for adjusting how many downlink data resources subjected to the resource assignments in the semi persistent scheduling are reserved. For example, if extra resources for the downlink data subjected to the resource assignments in accordance with the semi persistent scheduling must be reserved due to significant variations due to the resources for the downlink data subjected to the resource assignments in accordance with the semi persistent scheduling, the weight factor $weight_{Persistent,DL}$ may be set to 2. On the other hand, if extra resources for the downlink data subjected to the resource assignments in accordance with the semi persistent scheduling do not have to be reserved due to slight variations of the resources for downlink data subjected to the resource assignments in accordance with the semi persistent scheduling, the weight factor $weight_{Persistent,DL}$ may be set to 1. At step S1116, the number of resource blocks in semi persistent subframe #m assigned to a downlink subjected to the resource assignments in accordance with the semi persistent scheduling is counted as the resource consumption amount DL_Resource(m).

Through the above steps S1104 to S1120, the resource consumption amount in the predefined cycle is calculated for each subframe.

A DRX ON duration setup operation in the DRX ON duration setup unit 204 is described with reference to FIG. 12.

In mobile communication systems, the DRX control (discontinuous reception control) is conducted for battery saving of the user equipment 100. The DRX control is conducted in the case where there is no data to be communicated or the case where the data to be communicated can be transmitted in only resources assigned in accordance with the semi persistent scheduling. In the DRX control, communications are made between the base station apparatus 200 and the user equipment 100 by division into a duration (ON duration or reception duration in the DRX) for enabling signals to be received from the base station apparatus 200 and a duration (OFF duration or non-reception duration in the DRX) for disabling signals to be received from the base station apparatus 200. Since the user equipment 100 does not have to transmit uplink signals and receive downlink signals in the OFF duration, it is possible to reduce power consumption.

The DRX ON duration setup unit 204 may set the DRX ON duration for the user equipment 100 based on the resource amount calculated by the RB consumption amount calculation unit 202. For example, the DRX ON duration setup unit 204 may set the DRX ON duration such that the resource consumption amount in semi persistent subframes within the ON duration is minimized. As one example, the case where the predefined cycle is equal to 20 ms, the semi persistent subframes #0-#19 are defined and the resource consumption amount is equal to 2, 3, . . . , 2, 5 is described.

Here, if the ON duration has 2 ms in length (two subframes), semi persistent subframes #0 and #1 would be the ON duration to minimize the resource consumption amount in the semi persistent subframes within the ON duration. In this case, the DRX ON duration setup unit 204 sets the semi persistent subframes #0 and #1 as the DRX ON duration of the user equipment 100. For the semi persistent subframes assigned as the DRX ON duration for a certain user equipment 100, downlink data is transmitted in downlink radio resources assigned to the certain user equipment in accordance with the semi persistent scheduling, which may increase the resource consumption amount. Thus, in the case where the DRX ON duration is set for the user equipments 100 within a cell sequentially to minimize the resource consumption amount of the semi persistent subframes within the ON duration, the DRX ON duration would be set to make the respective resource consumption amounts of the semi persistent subframes even. Here, the even resource consumption amounts of the semi persistent subframes means that the resources are assigned efficiently.

Although the DRX ON duration setup unit 204 sets the DRX ON duration to minimize the resource consumption amount of the persistent subframes within the ON duration, the DRX ON duration setup unit 204 instead may set the DRX ON duration such that position of the ON duration is randomly determined for user equipments within the cell.

[Uplink]

Figure 13:
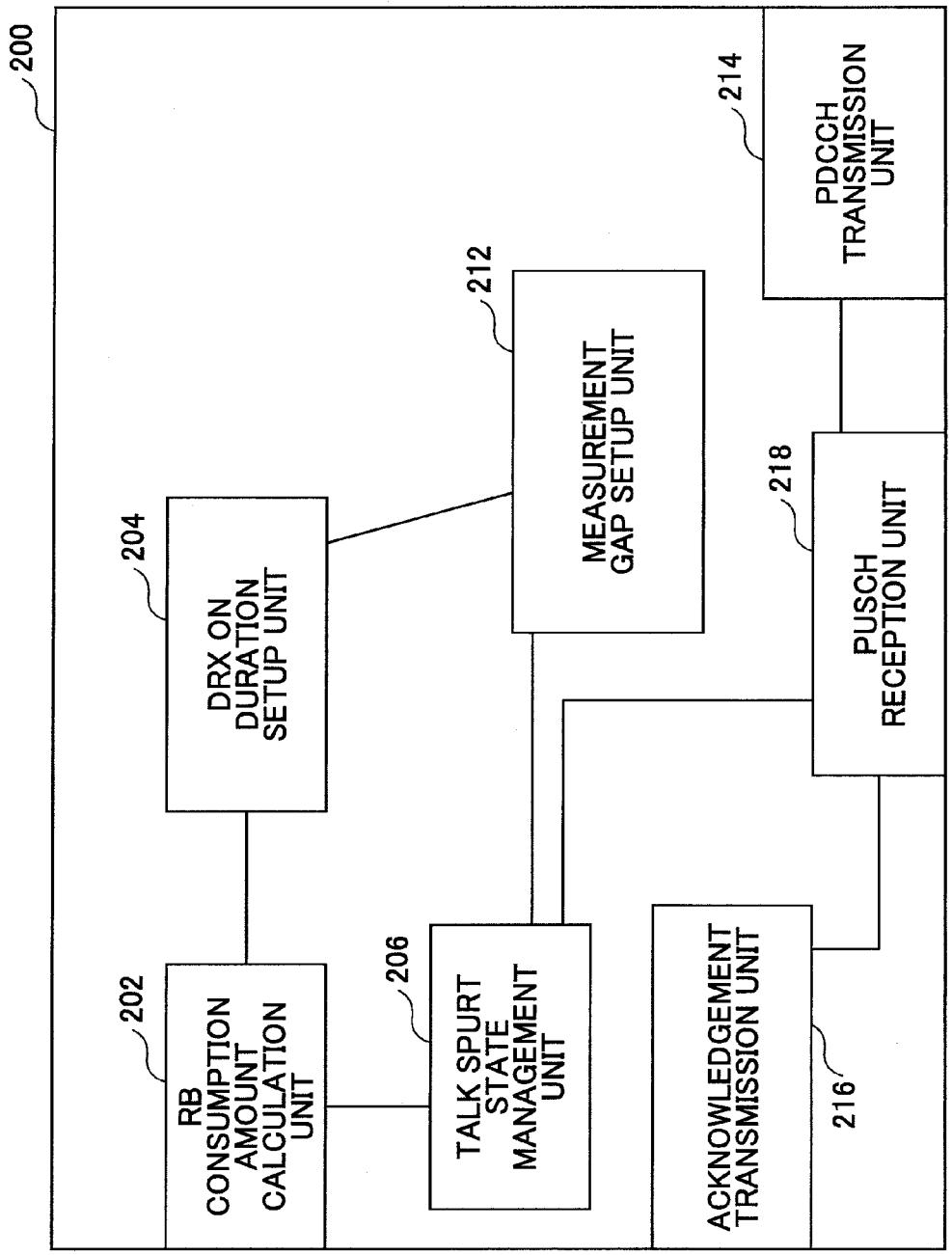
FIG. 13 is a partial block diagram illustrating a base station apparatus according to one embodiment.

The uplink is described with reference to FIG. 13.

The base station apparatus 200 according to this embodiment uses uplink radio resources persistently assigned at a predefined cycle having an assignment starting time point as a starting point to receive uplink data from the user equipment 100. The uplink radio resources may include radio resources for transmitting the PUSCH.

The base station apparatus 200 according to this embodiment includes a RB consumption amount calculation unit 202, a DRX ON duration setup unit 204, a Talk Spurt state management unit 206, a measurement gap setup unit 212, a PDCCH transmission unit 214, an acknowledgement information transmission unit 216 and a PUSCH reception unit 218.

The RB consumption amount calculation unit 202 calculates an amount of resources consumed for subframes within a transmission cycle in semi persistent scheduling. The transmission cycle may be predefined. The subframe may be referred to as a time frame. Here, the resources include frequency resources. The resource consumption amount includes an amount or quantity of resource blocks. For example, one resource block corresponds to 180 kHz in the LTE scheme. Also, one subframe corresponds to 1 ms. For example, if the predefined transmission cycle in semi persistent scheduling is set to 20 ms, the RB consumption amount calculation unit 202 calculates an amount of resources consumed for each of 20 subframes.

The DRX ON duration setup unit 204, which is connected to the RB consumption amount calculation unit 202, sets a reception duration in DRX of each user equipment 100 within a cell. The reception duration is an ON duration of the DRX state. For example, the DRX ON duration setup unit 204 sets the DRX ON duration based on the resource consumption amount calculated by the RB consumption amount calculation unit 202.

Alternatively, the DRX ON duration setup unit 204 may set the DRX ON duration based on the number of user equipments in the DRX ON duration for each subframe instead of the resource consumption amount. More specifically, the DRX ON duration setup unit 204 may set the DRX ON duration to minimize the number of user equipments in the DRX ON duration. Alternatively, the DRX ON duration setup unit 204 may set the DRX ON duration based on the number of user equipments at the starting point of the DRX ON duration for each subframe. More specifically, the DRX ON duration setup unit 204 may set the DRX ON duration such that a subframe corresponding to the minimum number of user equipments, for which the sub-frame is at the starting point of the DRX ON duration, is put at the starting point of the DRX ON duration.

The Talk Spurt state management unit 206, which is connected to the RB consumption amount calculation unit 202, manages Talk Spurt state of the respective user equipments within the cell, that is, whether to conduct resource assignment in accordance with semi persistent scheduling. Here, in the resource assignment in accordance with the semi persistent scheduling, uplink data is transmitted in uplink radio resources persistently assigned at a predefined cycle having the assignment starting time point as the starting point. The uplink radio resources include the PUSCH.

The PUSCH reception unit 218, which is connected to the Talk Spurt state management unit 206, received uplink data, which are transmitted in the uplink radio resources persistently assigned to the user equipment 100 having the Talk Spurt state being ON at the predefined cycle having the assignment starting time point as the starting point to receive uplink data. The uplink radio resources include the PUSCH.

The acknowledgement information transmission unit 216, which is connected to the PUSCH reception unit 218, transmits acknowledgement information to the uplink radio resources. The uplink radio resources include the PUSCH.

The measurement gap setup unit 212, which is connected to the DRX ON duration setup unit 204 and the Talk Spurt state management unit 206, sets a gap duration for measuring a cell (different frequency cell) having a frequency different from a camped cell (serving cell). The user equipment 100 conducts the different frequency measurement in the measurement gap. Also, the user equipment 100 conducts different RAT measurement in the measurement gap. The measurement gap may have a cycle of a multiple of 20 ms, for example. For example, the cycle of the measurement gap may include 40 ms, 80 ms and 120 ms. The measurement gap setup unit 212 assigns the gap duration to a DRX controlled user equipment such that a reception duration of the DRX control does not collide with the measurement gap. Particularly, since a semi persistent scheduling applied user equipment has a limited reception duration of downlink signals, the measurement gap setup unit 212 assigns the gap duration to the DRX controlled user equipment such that the reception duration in the DRX control does not collide with the measurement gap. Here, the downlink signal may be the PDCCH, for example. Also, since synchronous HARQ is applied in uplink semi persistent scheduling, the measurement gap setup unit 212 may assign the measurement gap such that retransmission timing does not collide with the measurement gap at a smaller number of retransmissions. This is because the collision with the measurement gap is not avoidable due to the fixed retransmission timing. In other words, the measurement gap setup unit 212 may assign the measurement gap such that the retransmission timing collides with the measurement gap at as large a number of retransmissions as possible. Generally, as the number of retransmission increases, the probability is reduced. For example, assuming that an error rate is equal to 10% per one transmission, the probability of the second transmission would be 10%, the probability of the third transmission would be 1%, and so on. Thus, the assignment of the measurement gap such that the retransmission timing collides with the measurement gap at as large a number of retransmissions as possible, in other words, means that the measurement gap is assigned such that the probability of collision of the retransmission timing of uplink signals with the measurement gap is reduced. In further other words, the assignment of the measurement gap such that the retransmission timing collides with the measurement gap at as large a number of retransmissions as possible means that the measurement gap is assigned to a time duration having a lower probability of uplink retransmission. Specifically, the measurement gap setup unit 212 sets the measurement gap immediately before the reception duration in the DRX control, as stated in conjunction with FIG. 9.

For example, the case where the DRX control is conducted from a time point when m subframes are shifted for a certain reference time point is described. In this case, starting time point A of the reception duration in the n-th DRX control is represented by the above-mentioned formula (1). For example, if the DRX cycle α=20, starting point A is represented as A=20×n+m.

Also, starting time point B of the measurement gap is represented by the above-mentioned formula (2). For example, if the cycle β of the measurement gap is equal to 40, starting time point B is represented as B=40×n+k.

If the measurement gap is set to 6 ms, for example, it is represented as k=m−6. Also, it may be represented as k=m−26.

In the case where the gap duration (measurement gap) is set immediately before the reception duration in the DRX control and there are multiple timings for setting the gap duration (e.g., k=m−6 and k=m−26 in the above example), the measurement gap setup unit 212 may set the gap duration based on the number of user equipments in the gap duration for each subframe. More specifically, if the multiple timings for setting the gap duration are provided, the gap duration may be set at a timing having the minimum number of user equipments in the gap duration. In this case, if the above operation is conducted for user equipments 100 within a cell sequentially, the gap duration would be set to make the number of user equipments in the gap duration in each subframe even. The even number of user equipments in the gap duration in the different subframes means that processing load in the base station is equalized in the time direction, which can avoid increasing the processing load in the base station at only a certain timing.

Alternatively, in the case where the measurement gap setup unit 212 may set the gap duration (measurement gap) immediately before the reception duration in the DRX control and there are multiple timings for setting the gap duration (e.g., k=m−6 and k=m−26 in the above example), the measurement gap setup unit 212 may select the timing among the multiple timings randomly. For example, if the two timings, k=m−6 and k=m−26, are provided similar to the above example, the measurement gap setup unit 212 may select k=m−6 with the probability of 0.5 and k=m−26 with the probability of 0.5. In this case, the gap duration would be set such that the number of user equipments in the gap duration is even for the different subframes. The even number of user equipments in the gap duration in the different subframes means that the processing load in the base station is equalized in the time direction, and accordingly it is possible to avoid increase in the processing load in the base station at only a certain timing.

Although the measurement gap setup unit 212 sets the gap duration (measurement gap) immediately before the reception duration in the DRX control in the above example, the measurement gap setup unit 212 may instead set the gap duration (measurement gap) shortly before the reception duration in the DRX control. More specifically, a guard duration of 1 ms may be provided before the reception duration in the DRX control, and the gap duration (measurement gap) may be provided immediately before the guard duration. In this case, k=m−7 or k=m−27 in the above-mentioned example of formulas (1) and (2). The guard duration may be set to 1 ms, 2 ms or any other value.

The PDCCH transmission unit 214, which is connected to the PUSCH reception unit 218, transmits an uplink scheduling grant to a user equipment if it is determined that resources for initial transmission for semi persistent scheduling are indicated. The uplink scheduling grant includes a persistent assignment signal. The uplink scheduling grant is mapped to the PDCCH.

The persistent assignment signal, that is, the PDCCH for indicating resources for the initial transmission for the semi persistent scheduling may be referred to as a PDCCH to which a CRC is masked in SPS-RNTI. Here, the SPS is an abbreviation of semi persistent scheduling.

Figure 14:
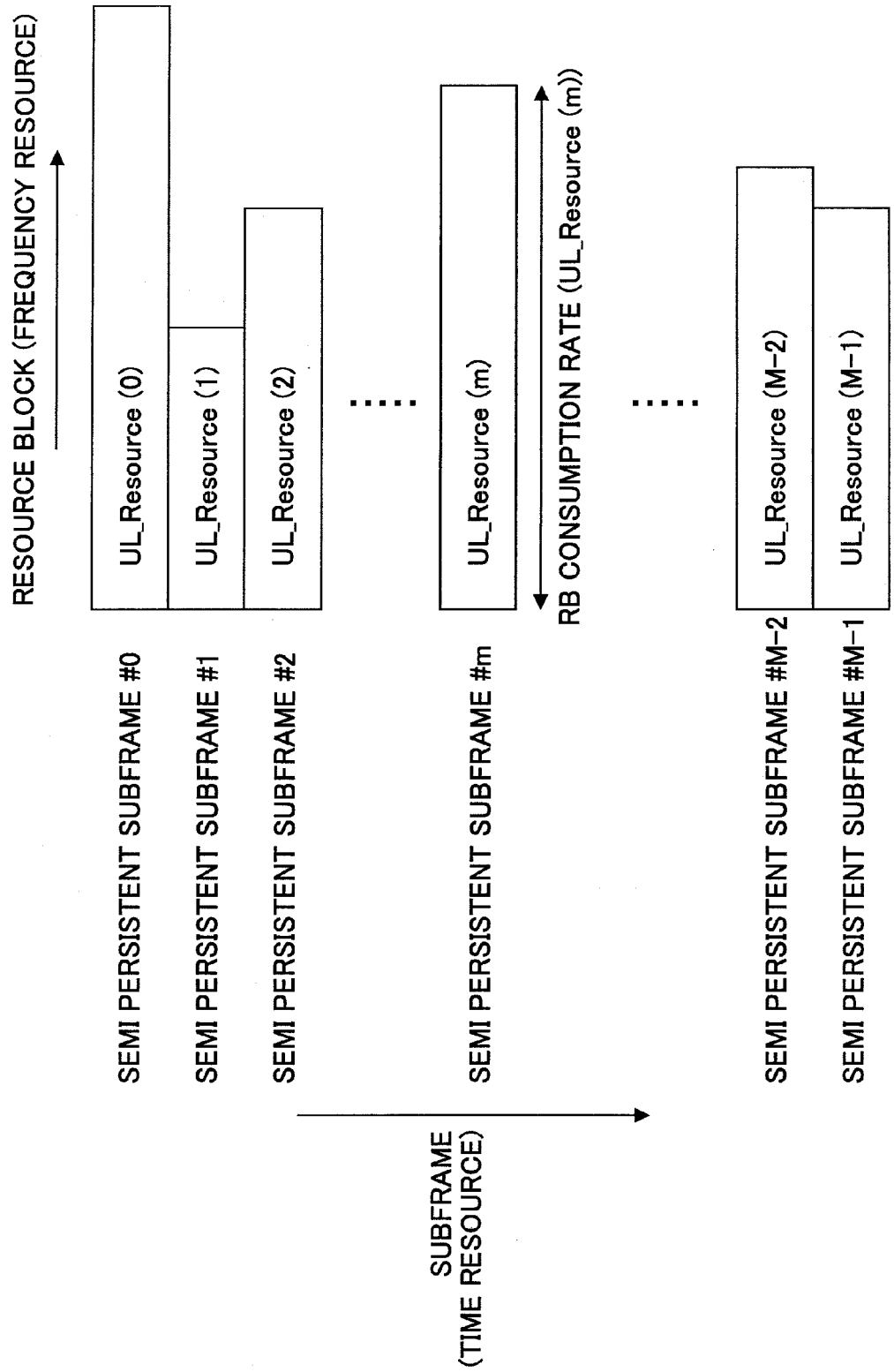
FIG. 14 is a schematic diagram illustrating calculation of a consumption amount of resource blocks at a base station apparatus according to one embodiment.

The calculation of the resource block consumption amount in the RB consumption amount calculation unit 202 is described in detail with reference to FIG. 14.

Subframes within a predefined cycle are defined as semi persistent subframes. The RB consumption amount calculation unit 202 calculates an amount of resources consumed for each semi persistent subframe. In FIG. 14, the resource consumption amount is indicated by UL_Resource(m) (m is an integer greater than or equal to 0). In FIG. 14, m is an index of the semi persistent subframes. In FIG. 14, M is the total number of the semi persistent subframes. In other words, M represents the total number of subframes within the predefined cycle.

The resource consumption amount UL_Resource(m) for each semi persistent subframe corresponds to a RACH (Random Access Channel), a RACH message 3 (message for the RACH), the number of resource blocks (RBs) assigned to a semi persistent scheduling applied UL-SCH and the number of guard RBs (guard resource blocks) in semi persistent subframe #m.

Figure 15:
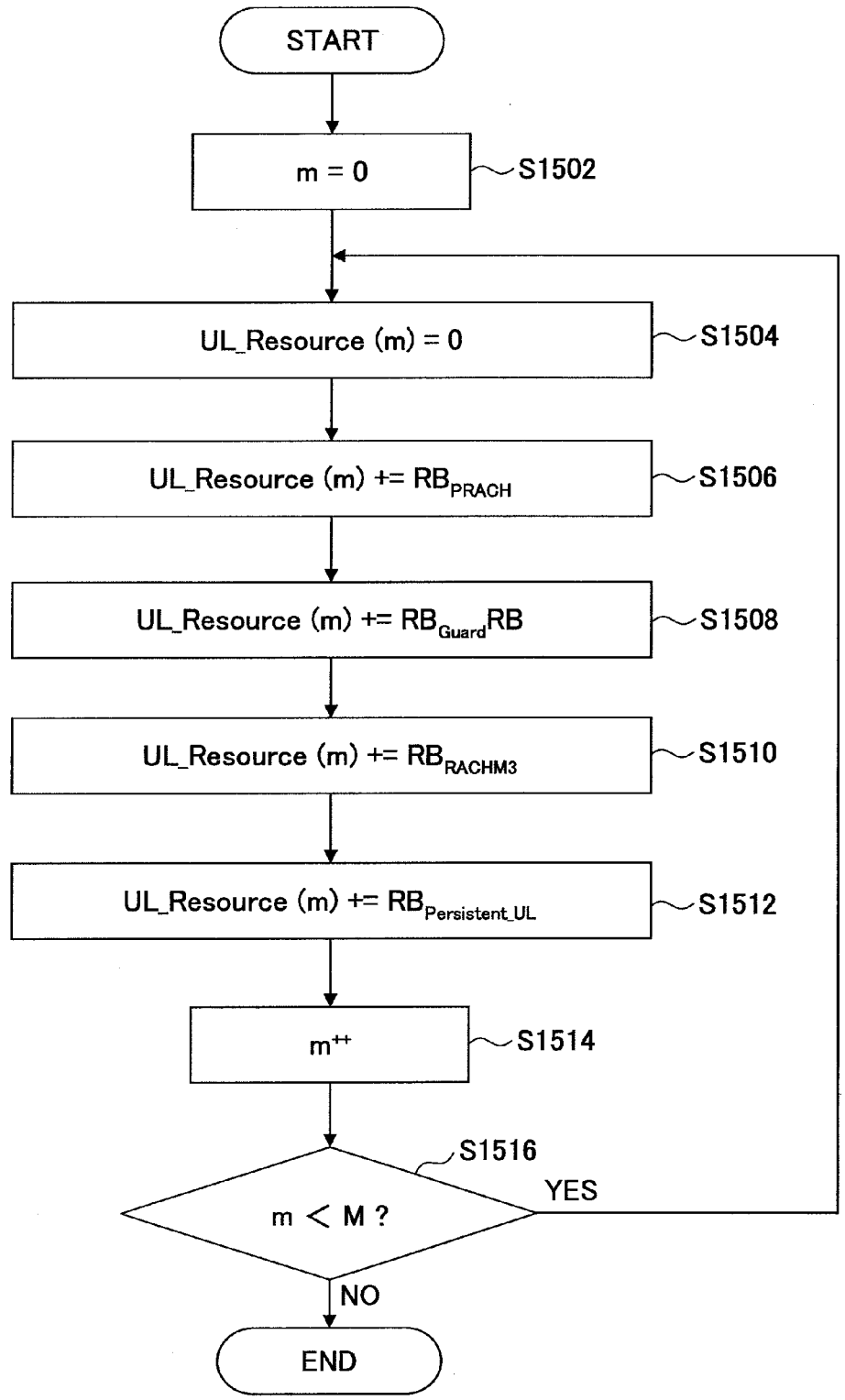
FIG. 15 is a flow diagram illustrating calculation of a consumption amount of resource blocks at a base station apparatus according to one embodiment.

A flow of an operation in the RB consumption amount calculation unit 202 is described with reference to FIG. 15.

At step S1502, the index of the semi persistent subframe is set to 0.

At step S1504, the UL=Resource(m) in semi persistent subframe #m is initialized.

At step S1506, resource blocks $RB_{PRACH}$ consumed for the RACH are added to UL_Resource(m). The resource blocks $RB_{PRACH}$ consumed for the RACH are calculated based on whether a PRACH (Physical Random Access Channel) is transmitted in semi persistent sub frame #m. For example, if the PRACH is transmitted in semi persistent subframe #m, $RB_{PRACH}$ is set to 6. On the other hand, if the PRACH is not transmitted in semi persistent subframe #m, $RB_{PRACH}$ is set to 0. At step S1506, if the PRACH is transmitted in semi persistent subframe #m, the number of resource blocks assigned to the PRACH is counted as the resource consumption amount UL_Resource(m).

At step S1508, resource blocks $RB_{GuardRB}$ consumed for guard resource blocks are added to UL_Resource(m). The resource blocks $RB_{GuardRB}$ consumed for the guard resource blocks correspond to the number of guard RBs assigned in semi persistent subframe #m. In other words, the number of guard RBs assigned in semi persistent subframe #m is counted. Instead of the number of guard RBs, the number of PUCCHs may be counted as the resource consumption amount UL_Resource(m).

At step S1510, resource blocks $RB_{RACH3}$ consumed for the RACH message 3 are added to UL_resource(m). The resource blocks $RB_{RACHM3}$ consumed for the RACH message 3 are calculated based on a time average value ($RB_{RACH3,average}$) of the number of resource blocks for the RACH message 3 previously transmitted in semi persistent subframe #m. For example, $RB_{RACHM3}$ may be calculated as $RB_{RACHM3}=RB_{RACHM3,average} \times weight_{RACHM3}$. Here, $weight_{RACHM3}$ is a factor for adjusting how many resources are reserved for the RACH message 3. For example, if extra resources must be reserved for the RACH message 3 due to significant variations of resources for the RACH message 3, $weight_{RACHM3}$ may be set to 2. On the other hand, for example, if extra resources do not have to be reserved for the RACH message 3 due to slight variations of resources for the RACH message 3, $weight_{RACHM3}$ may be set to 1. At step S1510, the number of resource blocks averagely assigned to the RACH message 3 is counted as the resource consumption amount UL_Resource(m).

At step S1512, the number of resource blocks $RB_{Persistent,UL}$ for uplink data subjected to resource assignment in accordance with the semi persistent scheduling is added to the UL_Resource(m). The uplink data includes both new transmission and retransmission. Assuming that only the new transmission is included in the uplink data instead of both the new transmission and the retransmission, the $RB_{Persistent,UL}$ may be added. The number of resource blocks $RB_{Persistent,UL}$ for uplink data subjected to resource assignment in accordance with the semi persistent scheduling is calculated based on a time average value ($RB_{Persistent,average,UL}$) of the number of resource blocks for the uplink data subjected to the resource assignment in accordance with the semi persistent scheduling previously transmitted in semi persistent subframe #m. For example, $RB_{Persistent,UL}$ may be calculated as $RB_{Persistent,UL}=RB_{Persistent,average,UL} \times weight_{Persistent,UL}$.
Here, $weight_{Persistent,UL}$ is a factor for adjusting how many resources are assigned in accordance with the semi persistent scheduling. For example, if extra resources must be reserved for uplink data subjected to resource assignment in accordance with the semi persistent scheduling due to significant variations of the resources for the uplink data subjected to the resource assignment in accordance with the semi persistent scheduling, the weight factor $weight_{Persistent,UL}$ may be set to 2. On the other hand, for example, if extra resources do not have to be reserved for the uplink data subjected to the resource assignment in accordance with the semi persistent scheduling due to slight variations of the resources for the uplink data subjected to the resource assignment in accordance with the semi persistent scheduling, $weight_{Persistent,UL}$ may be set to 1. At step S1512, the number of resource blocks in semi persistent subframe #m assigned to the uplink data subjected to the resource assignment in accordance with the semi persistent scheduling is counted as the resource consumption amount UL_Resource(m).

The resource consumption amount for each subframe at a predefined cycle is calculated through above-mentioned steps S1504-S1512.

A DRX ON duration setup operation in the DRX ON duration setup unit 204 is described with reference to FIG. 16.

In mobile communication systems, the DRX control (discontinuous reception control) is conducted for battery saving of the user equipment 100. In the case where there is no data to be communicated or the case where the data to be communicated can be transmitted in only resources assigned in accordance with the semi persistent scheduling, the DRX control is enabled. In the DRX control, communications are made between the base station apparatus 200 and the user equipment 100 through division into a reception duration (ON duration or reception duration in the DRX) for enabling a signal to be received from the base station apparatus 200 and a non-reception duration (OFF duration or non-reception duration in the DRX) for disabling a signal to be received from the base station apparatus 200. The user equipment 100 does not have to transmit uplink signals or receive downlink signals in the OFF duration, which can reduce power consumption.

The DRX ON duration setup unit 204 may set the ON duration for the user equipment 100 based on the resource amount calculated by the RB consumption amount calculation unit 202. For example, the DRX ON duration setup unit 204 may set the DRX ON duration such that the resource consumption amount in semi persistent subframes within the ON duration is minimized. As one example, the case where the predefined cycle is equal to 20 ms, semi persistent subframes #0-#19 are defined and the resource consumption amount is equal to 2, 3, . . . , 2, 5 is described.

Here, if the ON duration is 2 ms (2 subframes) in length, semi persistent subframes #0 and #1 would be the ON duration corresponding to the minimum resource consumption amount in the semi persistent subframes within the ON duration. In this case, the DRX ON duration setup unit 204 sets semi persistent subframes #0 and #1 as the DRX ON duration for the user equipment 100. For the semi persistent subframes assigned to a certain user equipment 100 as the DRX ON duration, uplink data is transmitted in uplink radio resources assigned to the certain user equipment in accordance with the semi persistent scheduling, which may increase the resource consumption amount. Thus, if the DRX ON duration setup operation is conducted for the user equipments 100 within the cell sequentially to minimize the resource consumption amount for the semi persistent subframes within the ON duration, the DRX ON duration would be set to make the respective resource consumption amounts for the semi persistent subframes even. Here, the even resource consumption amounts for the respective semi persistent subframes means that the resources are assigned efficiently.

Although the DRX ON duration setup unit 204 sets the DRX ON duration to minimize the resource consumption amount for the persistent subframes within the ON duration in the above-mentioned example, the DRX ON duration setup unit 204 may instead set the DRX ON duration such that position of the ON duration is randomly set for the user equipments within the cell.

Figure 17:
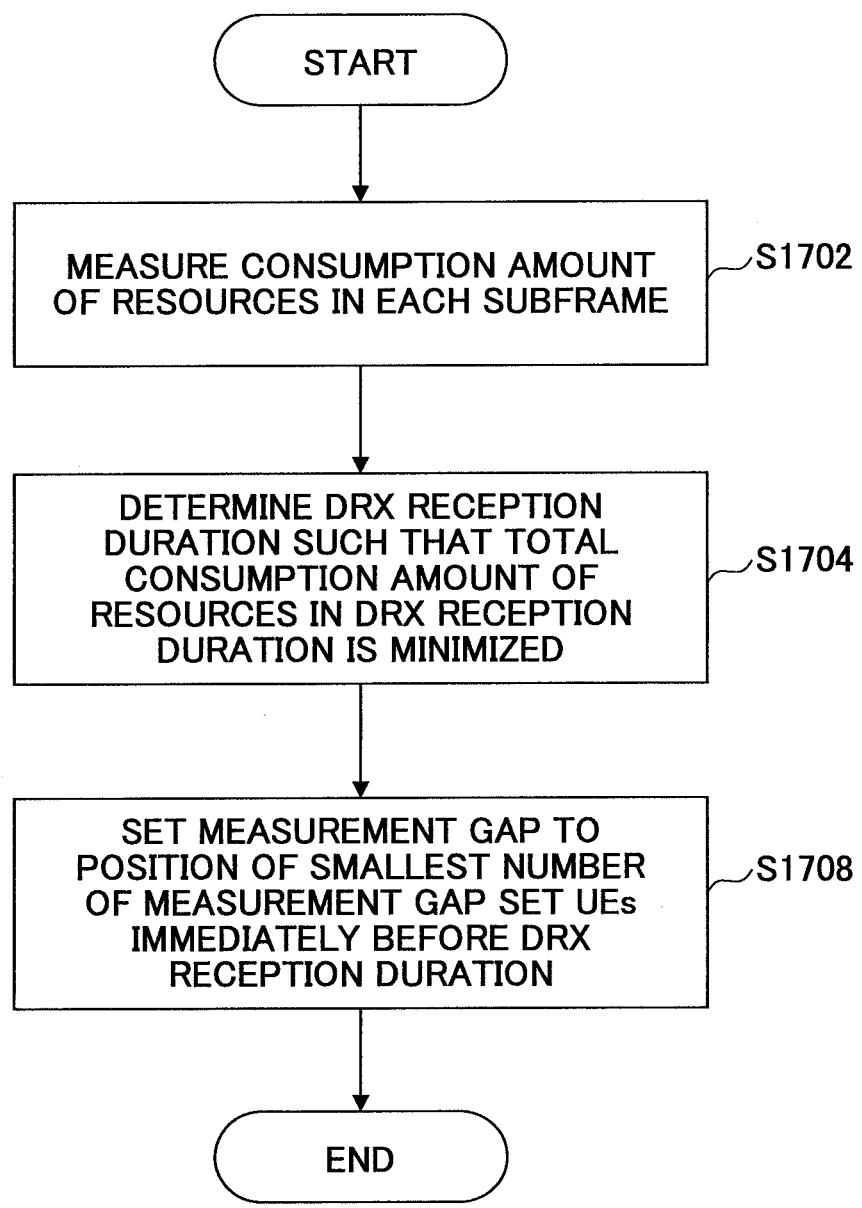
FIG. 17 is a flow diagram illustrating an operation of a base station apparatus according to one embodiment.

An operation of the base station apparatus 200 according to this embodiment is described with reference to FIG. 17.

At step S1702, the base station apparatus 200 measures the resource consumption amount for each subframe. For example, the RB consumption amount calculation unit 202 measures the resource consumption amount for each subframe as stated above.

The base station apparatus 200 determines the reception duration in the DRX control such that the total amount of resources consumed in the DRX reception duration is minimized. For example, the DRX ON duration setup unit 204 determines the DRX reception duration such that the total amount of resources consumed in the DRX reception duration is minimized for a user equipment determined to be DRX controlled.

The base station apparatus 200 sets the measurement gap immediately before the reception duration in the DRX control. The base station apparatus 200 may set the measurement gap immediately before the reception duration in the DRX control such that a subframe having a smaller number of measurement gap assigned user equipments is included. For example, the measurement setup unit 212 may set the measurement gap immediately before the reception duration in the DRX control such that a subframe having a smaller number of measurement gap assigned user equipments is included.

In the above-mentioned embodiment, the DRX ON duration setup unit 204 may set the DRX ON duration based on amounts of resources consumed for uplinks and downlinks. In this case, the RB consumption amount calculation unit 202 may calculate the amounts of resources consumed for uplinks and downlinks. Alternatively, the DRX ON duration setup unit 204 may set the DRX ON duration based on the number of user equipments in the DRX ON duration for each subframe.

Although the uplinks and the downlinks have been separately described in the above-mentioned embodiment, a single base station apparatus may include both the functions. In this case, the base station apparatus includes the functions described with reference to FIG. 8 and FIG. 13.

Also, the above-mentioned embodiment has been described in conjunction with the case where the semi persistent scheduling is applied, but similar operations can be applied to the case where only dynamic scheduling is applied without the semi persistent scheduling. In other words, even if only the dynamic scheduling is applied, the base station apparatus may set the measurement gap immediately before the reception duration (ON duration) in the DRX control. In this case, the reception duration (ON duration) in the DRX control may be set such that the reception duration (ON duration) is randomly positioned for UEs within a cell. Alternatively, the reception duration (ON duration) in the DRX control may be assigned to UEs among reception duration candidates within the DRX cycle based on Round Robin. For example, if the DRX cycle is equal to 20 ms and the ON duration is 4 ms in length, the reception duration (ON duration) candidates within the DRX cycle would correspond to subframes #0-#3, subframes #1-#4, subframes #2-#5, subframes #19-#22 (where #20-#23 are the same as #0-#3), and the base station apparatus may select the reception duration (ON duration) in the DRX control assigned to UEs among the reception duration candidates based on the Round Robin. Alternatively, the reception duration (ON duration) candidates within the DRX cycle may be subframes #0-#3, subframes #4-#7, subframes #8-#11, subframes #12-#15 and subframes #16-#19 (where #20-#23 are the same as #0-#3). If the reception duration (ON duration) candidates within the DRX cycle are subframes #0-#3, subframes #4-#7, subframes #8-#11, subframes #12-#15 and subframes #16-#19, the reception duration (ON duration) candidates within the DRX cycle cannot overlap with each other. Also, the reception duration (ON duration) within the DRX cycle may be assignable reception durations (ON durations) within the DRX cycle.

According to this embodiment, it is possible to reduce overlap between the DRX reception duration and the gap duration and collision between the uplink retransmission and the gap duration.

According to this embodiment, if multiple user equipments exist within a cell, it is possible to set the gap duration and the reception duration to the user equipments at different timings. Accordingly, the measurement gap and the DRX control for a large number of user equipments do not have to be managed at a certain timing, which can avoid increase in processing load of the base station apparatus at the certain timing.

Although the Evolved UTRA and UTRAN (Long Term Evolution or Super 3G) applied systems have been described in the above-mentioned embodiment, a base station apparatus, a user equipment and a communication control method according to the present invention can be applied to all types of systems using the OFDMA scheme in downlinks.

For convenience, the present invention has been described using specific numerals in order to facilitate understandings of the present invention, but unless specifically stated otherwise, these numerals are simply illustrative, and any other appropriate value may be used.

Although the present invention has been described with reference to specific embodiments, these embodiments are simply illustrative, and various variations, modifications, alterations, substitutions and so on could be conceived by those skilled in the art. For convenience, apparatuses according to the embodiments of the present invention have been described with reference to functional block diagrams, but the apparatuses may be implemented in hardware, software or combinations thereof. The present invention is not limited to the above-mentioned embodiment and is intended to include various variations, modifications, alterations, substitutions and so on without departing from the spirit of the present invention This international patent application is based on Japanese Priority Application No. 2008-165137 filed on Jun. 24, 2008, the entire contents of which are hereby incorporated by reference.

List Of Reference Symbols
50: cell
100 ($100_1$-$100_n$): user equipment
200: base station apparatus
202: RB consumption amount calculation unit
204: DRX ON duration setup unit
206: Talk Spurt state management unit
208: PDSCH transmission unit
210: acknowledgement information reception unit
212: measurement gap setup unit
214: PDCCH transmission unit
216: acknowledgement information transmission unit
218: PUSCH reception unit
300: access gateway apparatus
400: core network

The invention claimed is:
1. A base station apparatus, comprising:
a measurement gap assignment unit configured to assign a user equipment a measurement gap for measuring received quality for a frequency different from a frequency assigned to the user equipment; and
a DRX duration assignment unit configured to assign a DRX controlled user equipment a DRX ON duration,
wherein the measurement gap assignment unit sets the measurement gap to a duration other than the DRX ON duration, the duration having a low probability of retransmission of an uplink signal occurring.

2. The base station apparatus as claimed in claim 1, wherein the measurement gap assignment unit sets the measurement gap to include a subframe immediately before the DRX ON duration.

3. The base station apparatus as claimed in claim 2, wherein the measurement gap assignment unit assigns the measurement gap such that a starting point of the measurement gap is set to a time point preceding a starting time point of the DRX ON duration by a length of the measurement gap.

4. The base station apparatus as claimed in claim 1, wherein the DRX assignment unit assigns the DRX ON duration based on an amount of resources consumed in each time frame.

5. The base station apparatus as claimed in claim 4, wherein the DRX ON duration assignment unit sets a DRX ON reception duration in the DRX such that a total amount of resources consumed for a time frame within the DRX ON reception duration is minimized.

6. The base station apparatus as claimed in claim 4, wherein the DRX duration assignment unit sets a DRX ON reception duration to make a number of user equipments in the measurement gap for each time frame the same.

7. The base station apparatus as claimed in claim 4, wherein the DRX duration assignment unit sets a DRX ON reception duration among assignable measurement gaps based on Round Robin.

8. The base station apparatus as claimed in claim 1, wherein the measurement gap assignment unit assigns the user equipment the measurement gap for measuring received quality for a different frequency cell included in a system having the base station apparatus and/or for a cell to which a radio access technology is applied different from a radio access technology applied to the system.

9. The base station apparatus as claimed in claim 1, wherein the measurement gap assignment unit indicates an assigned measurement gap in a message for specifying measurement configuration in RRC.

10. A communication control method, comprising:

a base station apparatus assigning a user equipment a measurement gap for measuring received quality for a frequency different from a frequency assigned to the user equipment; and the base station apparatus assigning a DRX controlled user equipment a DRX ON duration, wherein the assigning the user equipment the measurement gap comprises setting the measurement gap to a duration other than the DRX ON duration, the duration having a low probability of retransmission of an uplink signal occurring.

* * * * *